US011327522B2

(12) United States Patent
Kobata et al.

(10) Patent No.: US 11,327,522 B2
(45) Date of Patent: May 10, 2022

(54) INFORMATION PROCESSING APPARATUS AND CIRCUIT DEVICE

(71) Applicant: FUJIFILM Business Innovation Corp., Tokyo (JP)

(72) Inventors: Masahiro Kobata, Kanagawa (JP); Kenji Imamura, Kanagawa (JP); Shinho Ikeda, Kanagawa (JP); Kazuhiko Abe, Kanagawa (JP); Yuji Murata, Kanagawa (JP); Takanori Fukuoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 173 days.

(21) Appl. No.: 16/297,729

(22) Filed: Mar. 11, 2019

(65) Prior Publication Data

US 2019/0286185 A1 Sep. 19, 2019

(30) Foreign Application Priority Data

Mar. 19, 2018 (JP) ............................ JP2018-051729

(51) Int. Cl.

| | |
|---|---|
| ***G06F 1/04*** | (2006.01) |
| ***B41J 29/38*** | (2006.01) |
| ***G03G 15/00*** | (2006.01) |

(52) U.S. Cl.

CPC ................ *G06F 1/04* (2013.01); *B41J 29/38* (2013.01); *G03G 15/50* (2013.01)

(58) Field of Classification Search

CPC ... G06F 1/04; G06F 1/10; G03G 15/50; B41J 29/38

See application file for complete search history.

(56) References Cited

U.S. PATENT DOCUMENTS

| | | | | |
|---|---|---|---|---|
| 9,118,458 | B1 * | 8/2015 | Lintonen | G06F 1/06 |
| 9,235,255 | B2 | 1/2016 | Sasaki | |

(Continued)

FOREIGN PATENT DOCUMENTS

| | | |
|---|---|---|
| JP | 4231116 | 2/2009 |
| JP | 2012137946 | 7/2012 |

(Continued)

OTHER PUBLICATIONS

Office Action of Japan Counterpart Application, with English translation thereof, dated Feb. 1, 2022, pp. 1-9.

*Primary Examiner* — Xuxing Chen
*Assistant Examiner* — Hyun Soo Kim
(74) *Attorney, Agent, or Firm* — JCIPRNET

(57) ABSTRACT

An information processing apparatus includes a first controller that operates while receiving first power and executes device-independent control; a second controller that operates while receiving second power and controls a device on a basis of a command from the first controller; a clock management unit that operates while receiving continuous power, and limits supply of a first clock signal to the first controller until the first power is supplied and limits supply of a second clock signal to the second controller until the second power is supplied; and a reset cancellation management unit that operates while receiving continuous power, limits supply of a first reset cancellation signal to the first controller until operation using the first clock signal starts and limits supply of a second reset cancellation signal to the second controller until operation using the second clock signal starts.

16 Claims, 26 Drawing Sheets

130
V1 V2
MONITOR
170
CLOCK MANAGEMENT UNIT
V1
150
CLK1
RST1
SYSTEM CONTROLLER
160 (e.g., PCIE)
CONTINUOUS POWER
V1 V2
MONITOR
171
V2
151
CLK2
RST2
RESET CANCELLATION MANAGEMENT UNIT
DEVICE CONTROLLER

(56) References Cited

U.S. PATENT DOCUMENTS

| | | | | |
|---|---|---|---|---|
| 10,234,505 | B1 * | 3/2019 | Shivaray | G01R 31/3177 |
| 2007/0208963 | A1 * | 9/2007 | Shinto | G06F 1/32 713/500 |
| 2012/0182567 | A1 * | 7/2012 | Ono | H04N 1/00896 358/1.13 |
| 2013/0332758 | A1 * | 12/2013 | Sasaki | G06F 1/3287 713/322 |
| 2016/0109917 | A1 * | 4/2016 | Sasagawa | G06F 1/3268 713/310 |

FOREIGN PATENT DOCUMENTS

| | | |
|---|---|---|
| JP | 2013254376 | 12/2013 |
| JP | 2014071485 | 4/2014 |
| JP | 5581906 | 9/2014 |
| JP | 2016181054 | 10/2016 |

* cited by examiner

150
CONTROLLER A
VA
153
COMMUNICATION UNIT A
151
CONTROLLER B
VB
154
COMMUNICATION UNIT B
CLK_A
RST_C
CLK_B
171
VA
VB
182
183
RESET CANCELLATION UNIT A
RESET CANCELLATION UNIT B
RST_A
RST_B
181
TIMING MANAGEMENT UNIT
ENB_A
ENB_B
184
CLOCK GENERATING UNIT
170
CONTINUOUS POWER
VA OR VB

150
CONTROLLER A
COMMUNICATION UNIT A
153
VA
151
CONTROLLER B
COMMUNICATION UNIT B
154
VB
CLK_A
RST_A1
RST_B1
CLK_B
171
VA
VB
182
RESET CANCELLATION UNIT A
183
RESET CANCELLATION UNIT B
RST_A
RST_B
181
TIMING MANAGEMENT UNIT
ENB_A
ENB_B
184
CLOCK GENERATING UNIT
170
CONTINUOUS POWER
VA OR VB

CLOCK GENERATING UNIT
184
CLK_A
CLK_B
ENB_A
ENB_B
VA OR VB
CLOCK ENABLE GENERATING UNIT
191
MONITOR
VA
VB
181
CONTINUOUS POWER
CONTINUOUS POWER
RESET CANCELLATION SIGNAL GENERATING UNIT
192
RST_A1
RST_B1
RST_A
RST_B
RESET CANCELLATION UNIT A
182
RESET CANCELLATION UNIT B
183
VA
VB

CLOCK GENERATING UNIT
184
CLK_A
CLK_B
VA OR VB
ENB_C
CLOCK ENABLE GENERATING UNIT
191
VA
VB
MONITOR
CONTINUOUS POWER
CONTINUOUS POWER
181
RESET CANCELLATION SIGNAL GENERATING UNIT
192
RST_C
RST_A
RST_B
RESET CANCELLATION UNIT A
182
RESET CANCELLATION UNIT B
183
VA
VB

150
CONTROLLER A
151
CONTROLLER B
VA
VB
153
COMMUNICATION UNIT A
154
COMMUNICATION UNIT B
CLK_A
RST_A1
RST_B1
182
RESET CANCELLATION UNIT A
183
RESET CANCELLATION UNIT B
RST_B
RST_A
192
RESET CANCELLATION SIGNAL GENERATING UNIT
CLK_B
184
CLOCK GENERATING UNIT
ENB_A
ENB_B
191
CLOCK ENABLE GENERATING UNIT
181

150
CONTROLLER A
VA
153
COMMUNICATION UNIT A
CLK_A
182
RESET CANCELLATION UNIT A
184
CLOCK GENERATING UNIT
151
CONTROLLER B
VB
154
COMMUNICATION UNIT B
RST_C
183
RESET CANCELLATION UNIT B
RST_B
192
RESET CANCELLATION SIGNAL GENERATING UNIT
RST_A
CLK_B
191
CLOCK ENABLE GENERATING UNIT
ENB_C
181

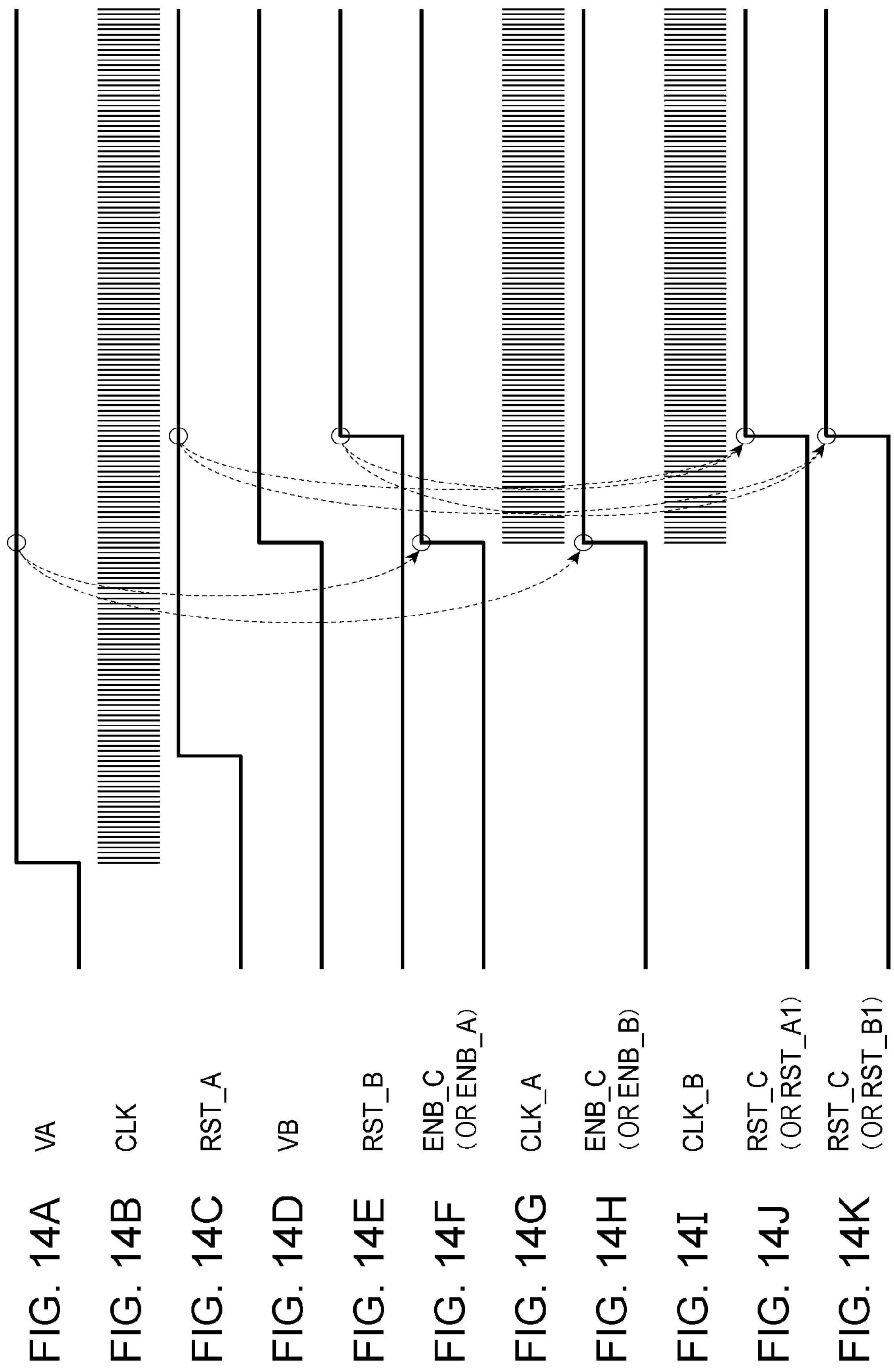
FIG. 14A VA
FIG. 14B CLK
FIG. 14C RST_A
FIG. 14D VB
FIG. 14E RST_B
FIG. 14F ENB_C (OR ENB_A)
FIG. 14G CLK_A
FIG. 14H ENB_C (OR ENB_B)
FIG. 14I CLK_B
FIG. 14J RST_C (OR RST_A1)
FIG. 14K RST_C (OR RST_B1)

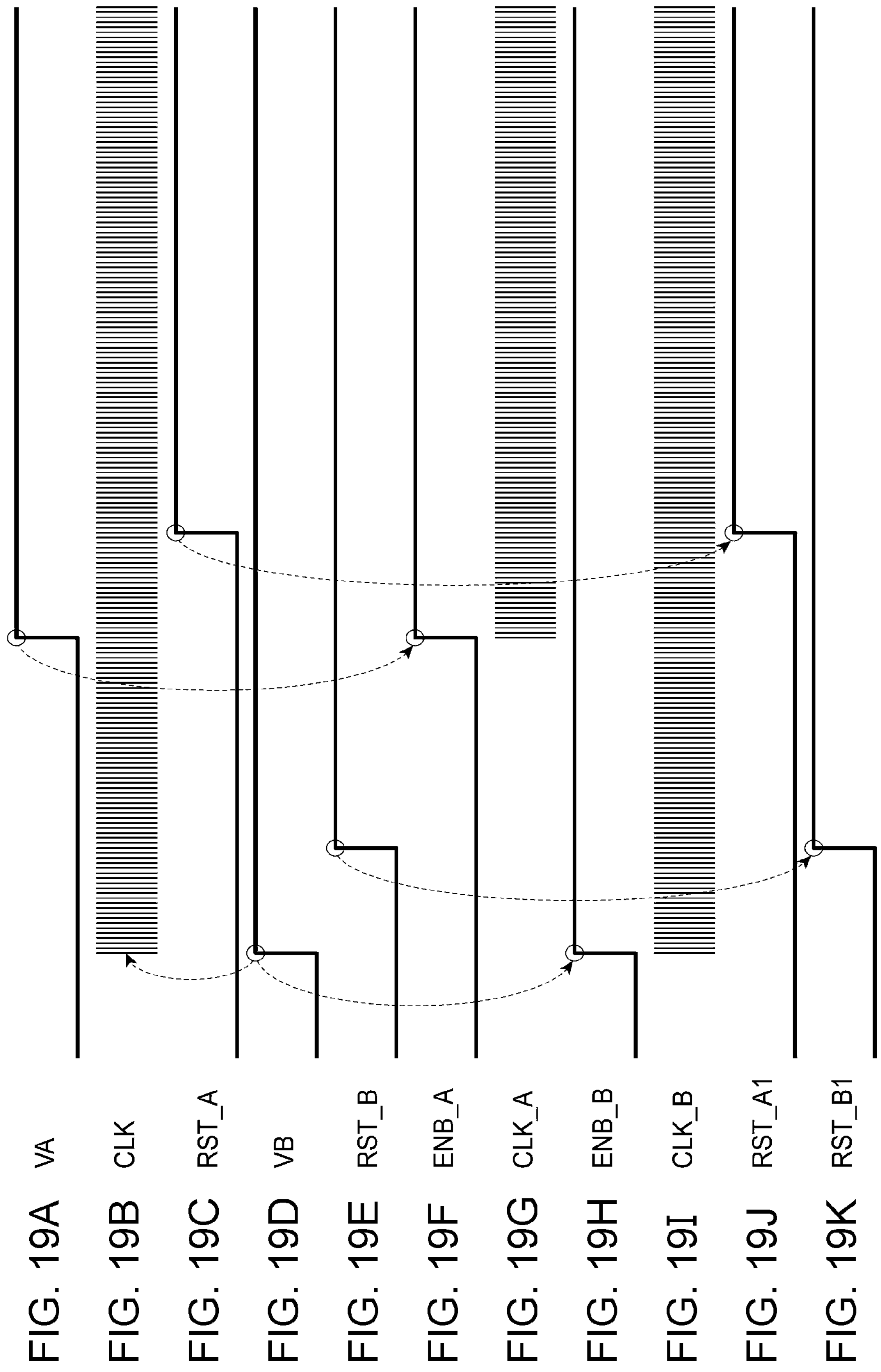
FIG. 19A VA
FIG. 19B CLK
FIG. 19C RST_A
FIG. 19D VB
FIG. 19E RST_B
FIG. 19F ENB_A
FIG. 19G CLK_A
FIG. 19H ENB_B
FIG. 19I CLK_B
FIG. 19J RST_A1
FIG. 19K RST_B1

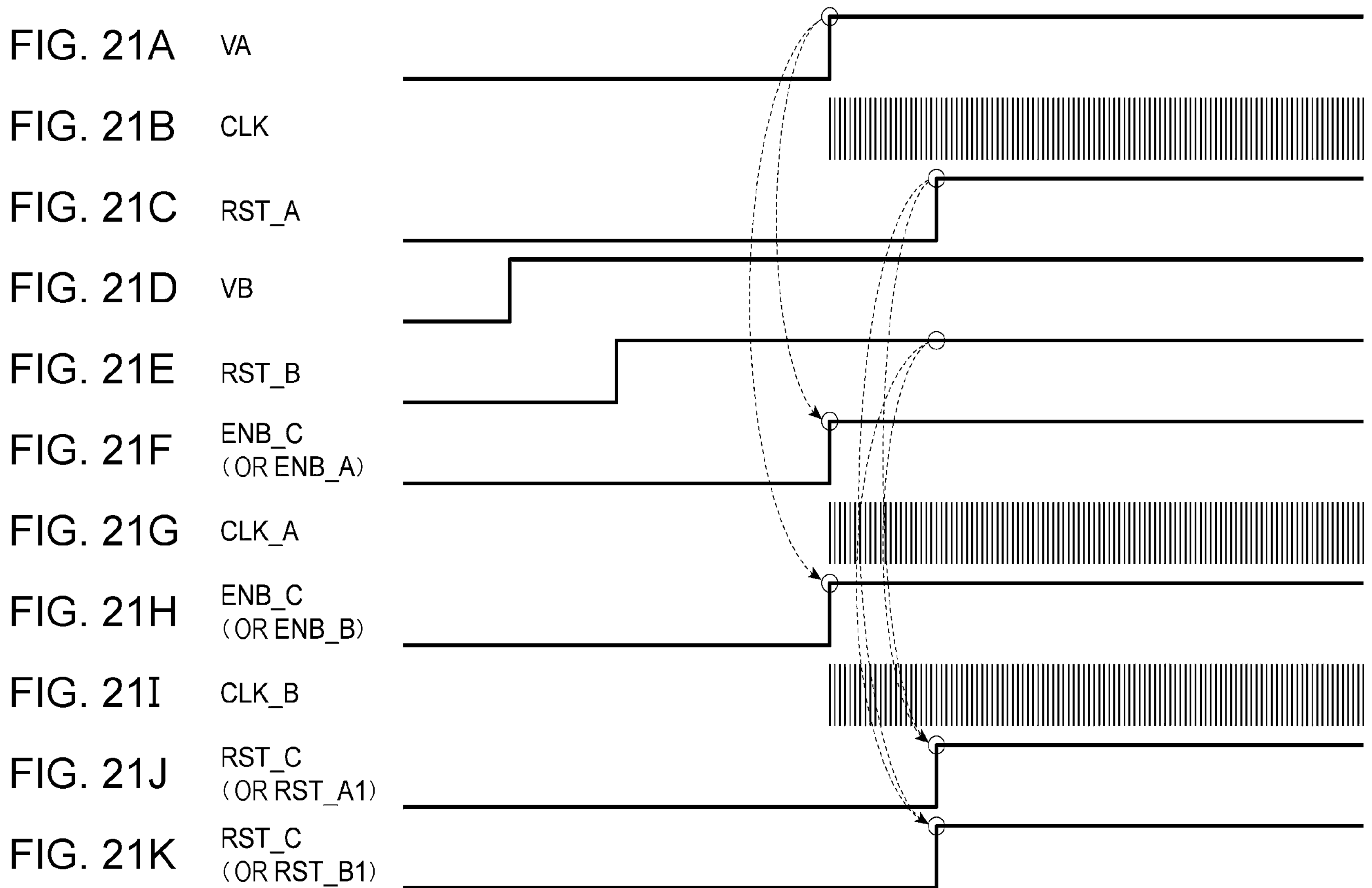
FIG. 21A VA
FIG. 21B CLK
FIG. 21C RST_A
FIG. 21D VB
FIG. 21E RST_B
FIG. 21F ENB_C (OR ENB_A)
FIG. 21G CLK_A
FIG. 21H ENB_C (OR ENB_B)
FIG. 21I CLK_B
FIG. 21J RST_C (OR RST_A1)
FIG. 21K RST_C (OR RST_B1)

150
CONTROLLER A
200
COMMUNICATION DEVICE
155
COMMUNICATION UNIT
VA
184
CLOCK GENERATING UNIT
CLK_C
182
RESET CANCELLATION UNIT A
RST_A1
153
COMMUNICATION UNIT A
C CLK_A
151
CONTROLLER B
ENB_A
ENB_B
CLK_B
RST_A
VB
191
CLOCK ENABLE GENERATING UNIT
192
RESET CANCELLATION SIGNAL GENERATING UNIT
RST_B
183
RESET CANCELLATION UNIT B
154
COMMUNICATION UNIT B
RST_B1
181

| OPTION CLK | OPTION RST | STANDARD CLK | STANDARD RST |
|---|---|---|---|
| 0: COMMON<br>1: INDIVIDUAL | 0: COMMON<br>1: INDIVIDUAL | 0: COMMON<br>1: INDIVIDUAL | 0: COMMON<br>1: INDIVIDUAL |

CONTROLLER A – CONTROLLER B: CLK INDIVIDUAL, RST INDIVIDUAL
CONTROLLER A – CONTROLLER C: CLK COMMON, RST COMMON

CONTROLLER A – CONTROLLER B: PRIORITY ON POWER
CONTROLLER A – CONTROLLER C: PRIORITY ON FUNCTION

INFORMATION PROCESSING APPARATUS AND CIRCUIT DEVICE

CROSS-REFERENCE TO RELATED APPLICATIONS

This application is based on and claims priority under 35 USC 119 from Japanese Patent Application No. 2018-051729 filed Mar. 19, 2018.

BACKGROUND

(i) Technical Field

The present disclosure relates to an information processing apparatus and a circuit device.

(ii) Related Art

An apparatus that includes a first controller that performs hardware-independent control, a second controller that converts a command given by the first controller into a data format for hardware, and a communication interface that connects the first controller and the second controller.

Japanese Unexamined Patent Application Publication No. 2016-181054 is an example of the related art.

SUMMARY

In a case where power necessary for activation is supplied to plural controllers in different systems, the plural controllers cannot operate normally unless a clock signal and a reset cancellation signal are supplied in a correct order.

Aspects of non-limiting embodiments of the present disclosure relate to enabling the plural controllers to operate normally irrespective of the order of supply of power.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first controller that operates while receiving first power and executes device-independent control; a second controller that operates while receiving second power and controls a device on a basis of a command from the first controller; a clock management unit that operates while receiving continuous power, and limits supply of a first clock signal to the first controller until the first power is supplied and limits supply of a second clock signal to the second controller until the second power is supplied; and a reset cancellation management unit that operates while receiving continuous power, limits supply of a first reset cancellation signal to the first controller until operation using the first clock signal starts and limits supply of a second reset cancellation signal to the second controller until operation using the second clock signal starts.

BRIEF DESCRIPTION OF THE DRAWINGS

Exemplary embodiments of the present disclosure will be described in detail based on the following figures, wherein:

FIGS. 14A, 14B, 14C, 14D, 14E, 14F, 14G, 14H, 14I, 14J, and 14K are diagrams illustrating output timings of various signals in a case where power VA is turned on later than power VB;

FIGS. 19A, 19B, 19C, 19D, 19E, 19F, 19G, 19H, 19I, 19J, and 19K are diagrams illustrating output timings of various signals in a case where power VA is turned on later than power VB;

FIGS. 21A, 21B, 21C, 21D, 21E, 21F, 21G, 21H, 21I, 21J, and 21K are diagrams illustrating output timings of various signals in a case where power VA is turned on earlier than power VB;

FIG. 26 is a view for explaining an operation mode switching function; and

FIGS. 27A, 27B, and 27C illustrate an example of switching of an operation mode, in which FIG. 27A illustrates switching based on setting of a switch, FIG. 27B illustrates switching based on a target device, and FIG. 27C illustrates switching based on a purpose.

DETAILED DESCRIPTION

An exemplary embodiment of the present disclosure is described below with reference to the drawings.

Exemplary Embodiment

Configuration of Apparatus

Figure 1:
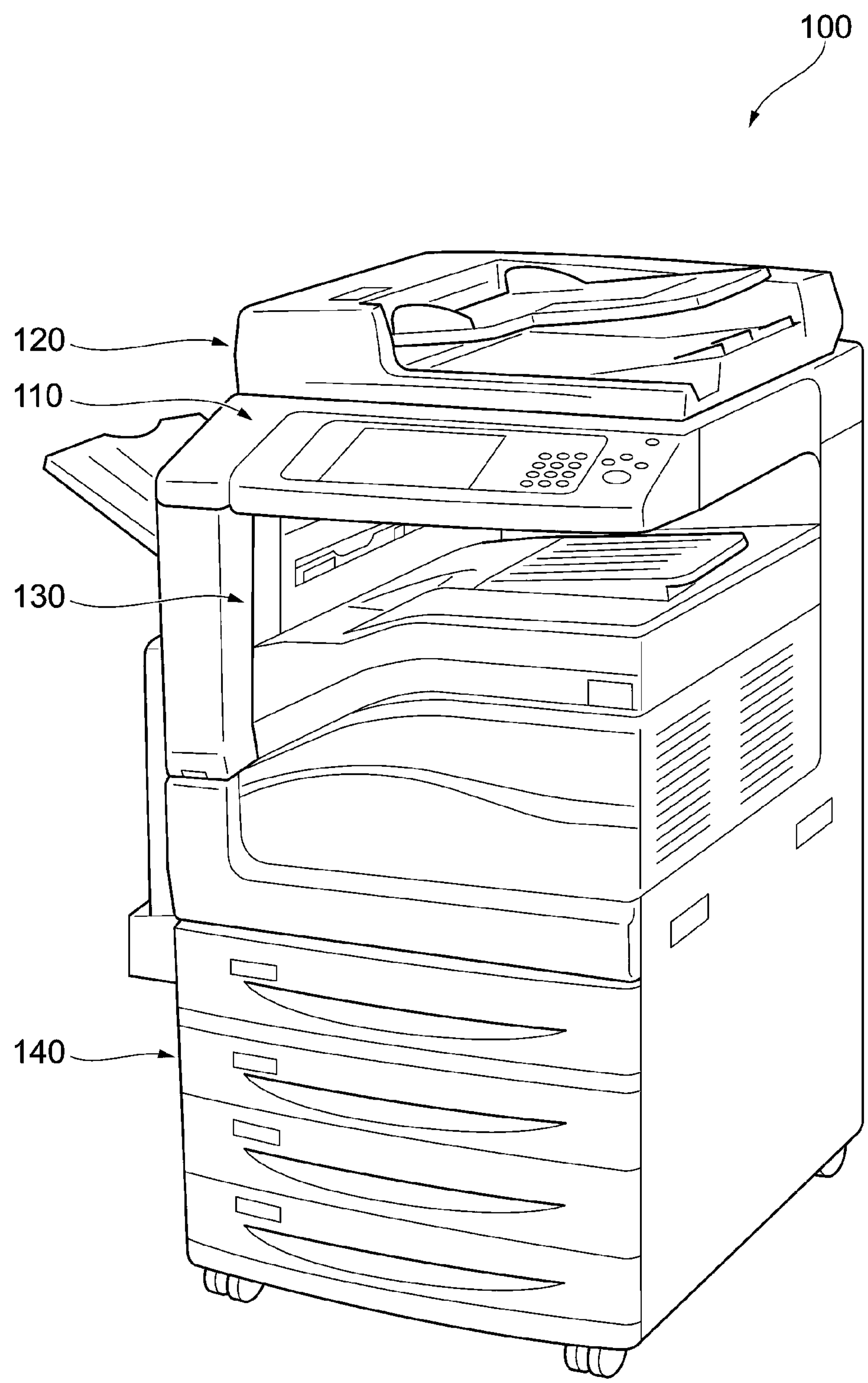
FIG. 1 is a view for explaining an example of a configuration of an image forming apparatus according to an exemplary embodiment.

FIG. 1 is a view for explaining an example of a configuration of an image forming apparatus 100 according to an exemplary embodiment.

The image forming apparatus 100 is an example of an information processing apparatus that forms an image on a recording material (hereinafter sometimes referred to as a "sheet of paper"). The image forming apparatus 100 illustrated in FIG. 1 has functions such as a copy function of making a copy, a scan function of reading a document image, a facsimile transmission reception function of transmitting and receiving a facsimile image to and from another apparatus, and a print function of recording an image on a sheet of paper. The copy function is a combination of the scan function and the print function.

The image forming apparatus 100 need not necessarily have all of the copy function, the scan function, and the facsimile transmission reception function and may be an apparatus specialized for any one of the functions. For example, the image forming apparatus 100 may be a copying machine, a scanner, a facsimile transmitter receiver, or a printer (including a three-dimensional printer).

The image forming apparatus 100 may have a configuration selectively combining some of these functions.

The image forming apparatus 100 includes a user interface unit 110 that is used to receive a user's operation and present various kinds of information to the user, an image reading unit 120 that reads a document image, an image forming unit 130 that records an image on a sheet of paper, and a containing unit 140 that contains a sheet of paper.

The image forming apparatus 100 is an example of an information processing apparatus. The image forming unit 130 is also an example of an information processing apparatus.

The image forming unit 130 is connected to the user interface unit 110 and the image reading unit 120 through a bus.

The user interface unit 110 and the image reading unit 120 are examples of a device.

The user interface unit 110 includes an operation receiving part that receives a user's instruction and a display that presents information to the user.

The image reading unit 120 includes an image reading part that optically reads an image formed on a document and a document transport part that transports a document to the image reading unit.

The image forming unit 130 includes an image forming part that forms an image on a sheet of paper according to an electrophotographic system or an inkjet system, a paper feed part that feeds a sheet of paper to the image forming part, a paper discharge part that discharges a sheet of paper on which an image has been formed, and a reversing transport part that reverses a sheet of paper and guides the sheet of paper to the image forming part. The image forming part is an example of a device controlled by a controller.

Configuration of Control System

Figure 2:
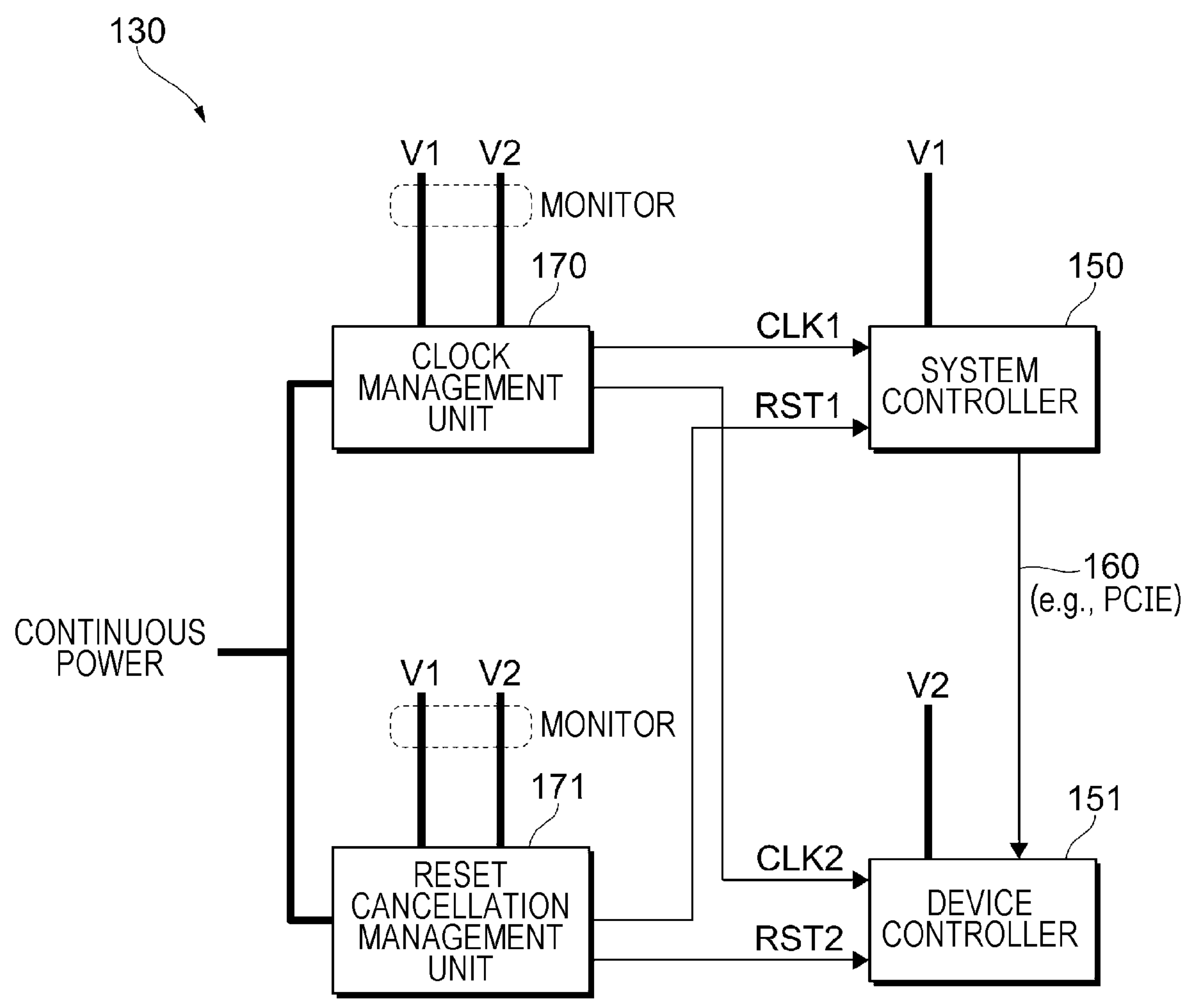
FIG. 2 is a view for explaining a hardware part of a control system of an image forming unit.

FIG. 2 is a view for explaining a hardware part of a control system of the image forming unit 130.

The control system includes a system controller 150 that performs device-independent control and a device controller 151 that controls the device (e.g., the image reading part or the image forming part) on the basis of a command from the system controller 150. The device controller 151 has a function of converting a command given by the system controller 150 into a signal for the device.

The system controller 150 is an example of a first controller, and the device controller 151 is an example of a second controller.

A cycle of development of the system controller 150 is shorter than a cycle of development of the device controller 151. For example, a cycle of development of the system controller 150 is approximately 2 years, whereas a cycle of development of the device controller 151 is approximately 6 years to 8 years.

Because of this difference in cycle of development, the system controller 150 and the device controller 151 are developed independently.

The system controller 150 and the device controller 151 are connected to each other through a communication line 160.

In the present exemplary embodiment, a peripheral component interconnect express (PCIS) is used as the communication line 160.

Power from different power sources is fed to the system controller 150 and the device controller 151. In FIG. 2, power for the system controller 150 is expressed by V1, and power for the device controller 151 is expressed by V2. V1 is an example of first power, and V2 is an example of second power.

The system controller 150 operates in accordance with a clock signal CLK1 and a reset cancellation signal RST1. CLK1 is a first clock signal, and RST1 is a first reset cancellation signal.

The device controller 151 operates in accordance with a clock signal CLK2 and a reset cancellation signal RST2. CLK2 is a second clock signal, and RST2 is a second reset cancellation signal.

In order that the system controller 150 and the device controller 151 normally operate, it is necessary that supply of a clock signal start after start of supply of power and supply of a reset cancellation signal start after start of supply of the clock signal.

For example, in order that the system controller 150 normally operates, it is necessary that the power V1 be supplied earlier than the clock signal CLK1 and the clock signal CLK1 be supplied earlier than the reset cancellation signal RST1.

The clock signals CLK1 and CLK2 are generated from a single clock source. A power source for feeding the power V1 or a power source for feeding the power V2 is connected to the clock source, and start of supply of power from the connected power source allows the clock source to output a clock. For example, in a case where the clock source is connected to the power source for feeding the power V1, start of supply of the power V1 allows the clock source to output the clock signals CLK1 and CLK2.

Meanwhile, there are various factors of restart of supply of power.

For example, in a case where a factor is on a system side, supply of the power V2 starts after start of supply of the power V1, whereas in a case where a factor is on a device side, supply of the power V1 starts after start of supply of the power V2.

Accordingly, in a controller that operates by power from a power source different from a power source connected to the clock source, there is a possibility that supply of power and supply of a clock signal are not executed in a correct order.

The reset cancellation signal RST1 is generated in association with the power V1, and the reset cancellation signal RST2 is generated in association with the power V2. Accordingly, in a case where supply of power to the clock source is later, there is a possibility that supply of a clock signal and supply of a reset cancellation signal are not executed in a correct order.

In view of this, in the present exemplary embodiment, supply of the clock signals CLK1 and CLK2 is managed by a clock management unit 170, and supply of the reset cancellation signals RST1 and RST2 is managed by a reset cancellation management unit 171.

Specifically, the clock management unit 170 operates upon receipt of continuous power, and limits supply of the clock signal CLK1 to the system controller 150 until supply of the power V1 and limits supply of the clock signal CLK2 to the device controller 151 until supply of the power V2.

Furthermore, the reset cancellation management unit 171 operates upon receipt of continuous power, and limits supply of the reset cancellation signal RST1 to the system controller 150 until start of operation using the clock signal CLK1 and limits supply of the reset cancellation signal RST2 to the device controller 151 until start of operation using the clock signal CLK2.

As illustrated in FIG. 2, the power V1 for the system controller 150, the power V2 for the device controller 151, and continuous power are supplied to the clock management unit 170 and the reset cancellation management unit 171.

Although the clock management unit 170 and the reset cancellation management unit 171 are disposed outside the system controller 150 and the device controller 151 in FIG. 2, each of the clock management unit 170 and the reset cancellation management unit 171 may be included in any one of the system controller 150 and the device controller 151.

That is, both of the clock management unit 170 and the reset cancellation management unit 171 may be included in the system controller 150 or both of the clock management unit 170 and the reset cancellation management unit 171 may be included in the device controller 151.

Alternatively, the clock management unit 170 may be included in the system controller 150, and the reset cancellation management unit 171 may be included in the device controller 151.

Alternatively, the clock management unit 170 may be included in the device controller 151, and the reset cancellation management unit 171 may be included in the system controller 150.

Alternatively, only the clock management unit 170 may be included in any one of the system controller 150 and the device controller 151, and the reset cancellation management unit 171 may be disposed outside the system controller 150 and the device controller 151.

Alternatively, only the reset cancellation management unit 171 may be included in any one of the system controller 150 and the device controller 151, and the clock management unit 170 may be disposed outside the system controller 150 and the device controller 151.

The clock management unit 170 and the reset cancellation management unit 171 may be configured as a single module.

The system controller 150, the clock management unit 170, and the reset cancellation management unit 171 may be configured as a single circuit device. This is because a cycle of development of the system controller 150 is shorter than a cycle of development of the device controller 151 as described above.

A portion of the clock management unit 170 and the reset cancellation management unit 171 that is used for control of the system controller 150 may be an independent circuit configuration. This circuit configuration is an example of a first management unit.

A portion of the clock management unit 170 and the reset cancellation management unit 171 that is used for control of the device controller 151 may be an independent circuit configuration. This circuit configuration is an example of a second management unit.

Configuration of Control System from Perspective of Way in Which Signals are Supplied The following describes an example of a configuration of a control system from the perspective of a way in which the clock signals CLK1 and CLK2 and the reset cancellation signals RST1 and RST2 are supplied to the system controller 150 and the device controller 151.

Configuration Example 1

Figure 3:
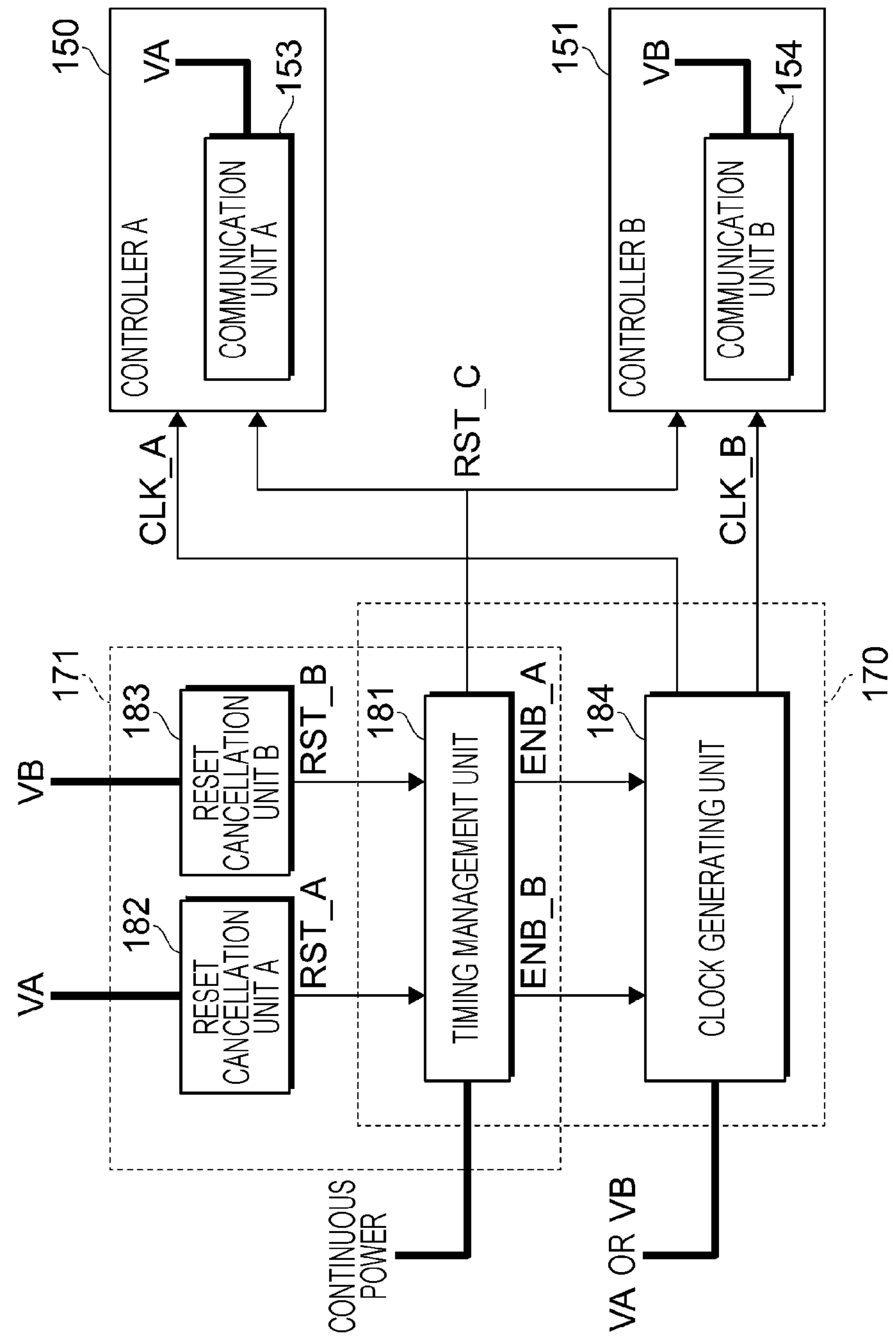
FIG. 3 is a view for explaining an example of configurations of a clock management unit and a reset cancellation management unit in a case where individual clock signals are supplied and a common reset cancellation signal is supplied.

FIG. 3 is a view for explaining an example of configurations of the clock management unit 170 and the reset cancellation management unit 171 in a case where individual clock signals are supplied and a common reset cancellation signal is supplied.

Figure 4:
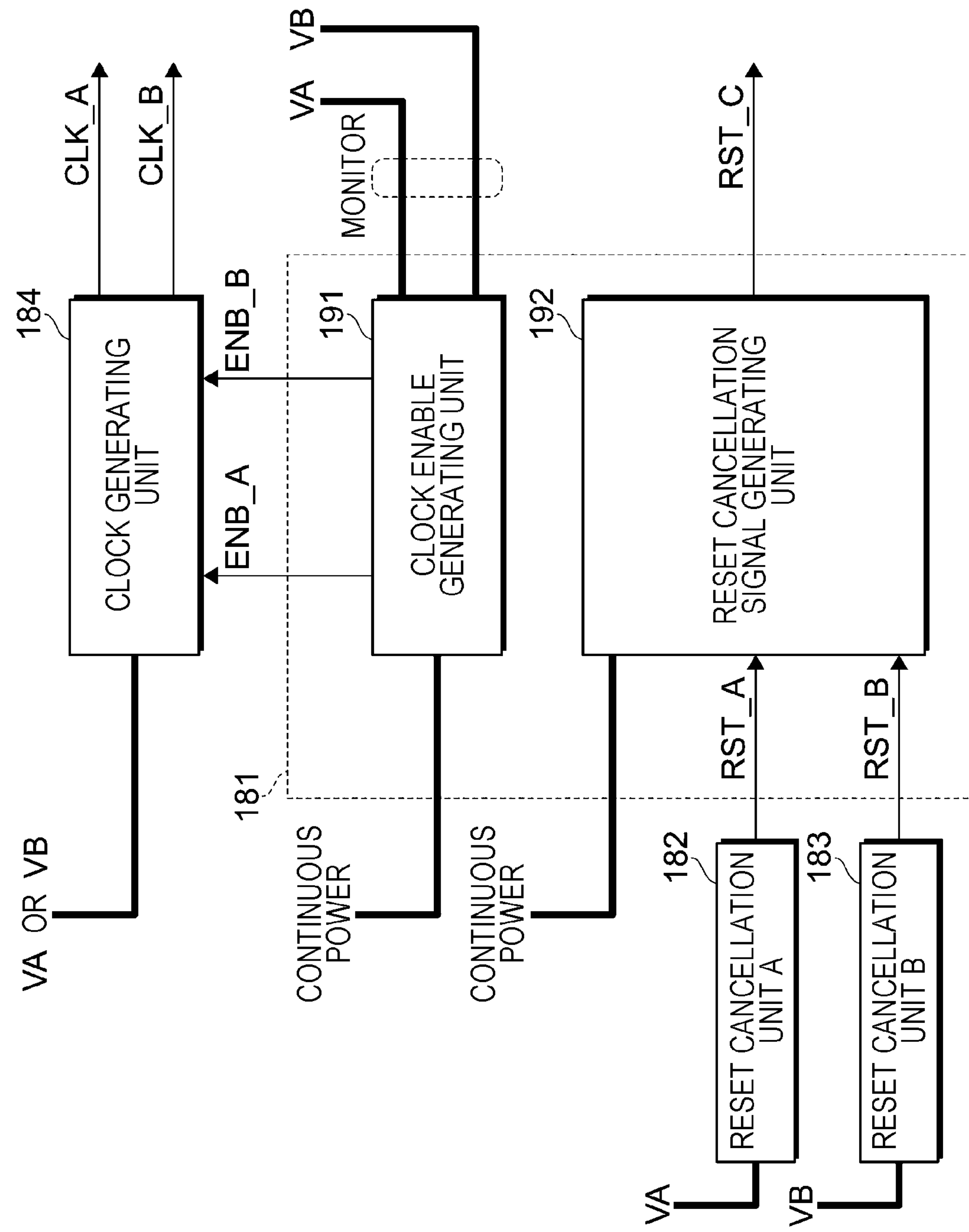
FIG. 4 is a view for explaining an internal configuration of a timing management unit according to Configuration Example 1.

FIG. 4 is a view for explaining an internal configuration of a timing management unit 181 according to Configuration Example 1.

In FIG. 3, the system controller 150 is expressed by a controller A, and the device controller 151 is expressed by a controller B.

Accordingly, power, a clock signal, a reset cancellation signal, and the like that correspond to the controller A are distinguished by using a reference sign A, and power, a clock signal, a reset cancellation signal, and the like that correspond to the controller B are distinguished by using a reference sign B.

That is, power VA and a clock signal CLK_A are given to a communication unit A (153) of the controller A.

Meanwhile, power VB and a clock signal CLK_B are given to a communication unit B (154) of the controller B.

A common second reset cancellation signal RST_C is given to the communication unit A (153) of the controller A and the communication unit B (154) of the controller B.

The clock management unit 170 includes the timing management unit 181 operating by using continuous power and a clock generating unit 184.

The timing management unit 181 generates a clock enable signal ENB_A for the controller A and a clock enable signal ENB_B for the controller B and controls operation of the clock generating unit 184. Each enable signal is generated by a clock enable generating unit 191 provided in the timing management unit 181.

The clock enable generating unit 191 monitors the power VA and VB, and changes the clock enable signal ENB_A to an ON state upon detection of supply of the power VA and changes the clock enable signal ENB_B to an ON state upon detection of supply of the power VB. The clock enable generating unit 191 operates by using continuous power.

The clock generating unit 184 operates by using power (the power VA or VB) from a power source connected to the clock generating unit 184.

The clock generating unit 184 outputs, as the clock signal CLK_A, a logical product (negative logical sum) of a potential of the power and a potential of the clock enable signal ENB_A and outputs, as the clock signal CLK_B, a logical product (negative logical sum) of a potential of the power and a potential of the clock enable signal ENB_B.

That is, an ON state of the clock enable signals ENB_A and ENB_B is not enough and an ON state of the power is not enough for output of the clock signals CLK_A and CLK_B from the clock generating unit 184.

The reset cancellation management unit 171 includes the timing management unit 181 operating by using continuous power, a reset cancellation unit A (182), and a reset cancellation unit B (183).

In the present exemplary embodiment, the reset cancellation management unit 171 shares the timing management unit 181 with the clock management unit 170.

The reset cancellation unit A (182) operates by using the power VA for the controller A and changes a first reset cancellation signal RST_A for the controller A to an ON state upon detection of supply of the power VA.

The reset cancellation unit B (183) operates by using the power VB for the controller B and generates a first reset cancellation signal RST_B for the controller B upon detection of supply of the power VB.

Each of the reset cancellation unit A (182) and the reset cancellation unit B (183) is constituted, for example, by an integrated circuit (IC). Each of the reset cancellation unit A (182) and the reset cancellation unit B (183) has, for example, a delay circuit (or a time measuring unit) that delays a signal by a predetermined period from change of power from the monitored power to an ON state.

The first reset cancellation signals RST_A and RST_B are given to a reset cancellation signal generating unit 192 provided in the timing management unit 181. The reset cancellation signal generating unit 192 operates by using continuous power and generates a second reset cancellation signal RST_A for the controller A and a second reset cancellation signal RST_B1 for the controller B on the basis of a predetermined rule.

In this configuration example, the reset cancellation signal generating unit 192 resets the controller A and the controller B concurrently. Accordingly, the reset cancellation signal generating unit 192 outputs, as a common second reset cancellation signal RST_C, a logical product (negative logical sum) of the first reset cancellation signal RST_A and the first reset cancellation signal RST_B.

Configuration Example 2

Figure 5:
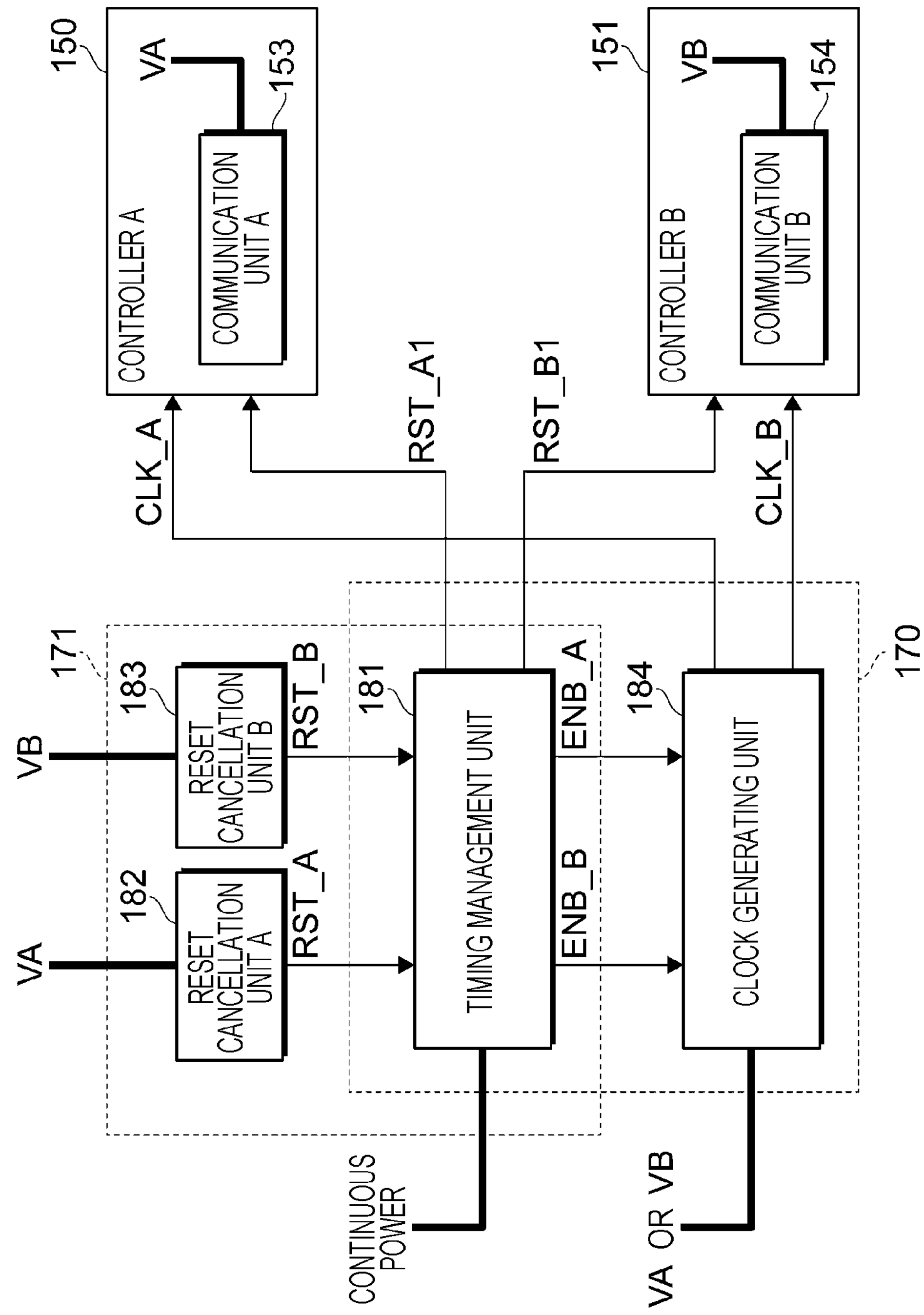
FIG. 5 is a view for explaining an example of configurations of a clock management unit and a reset cancellation management unit in a case where individual clock signals are supplied and individual reset cancellation signals are supplied.

FIG. 5 is a view for explaining an example of configurations of the clock management unit 170 and the reset cancellation management unit 171 in a case where individual clock signals are supplied and individual reset cancellation signals are supplied.

Figure 6:
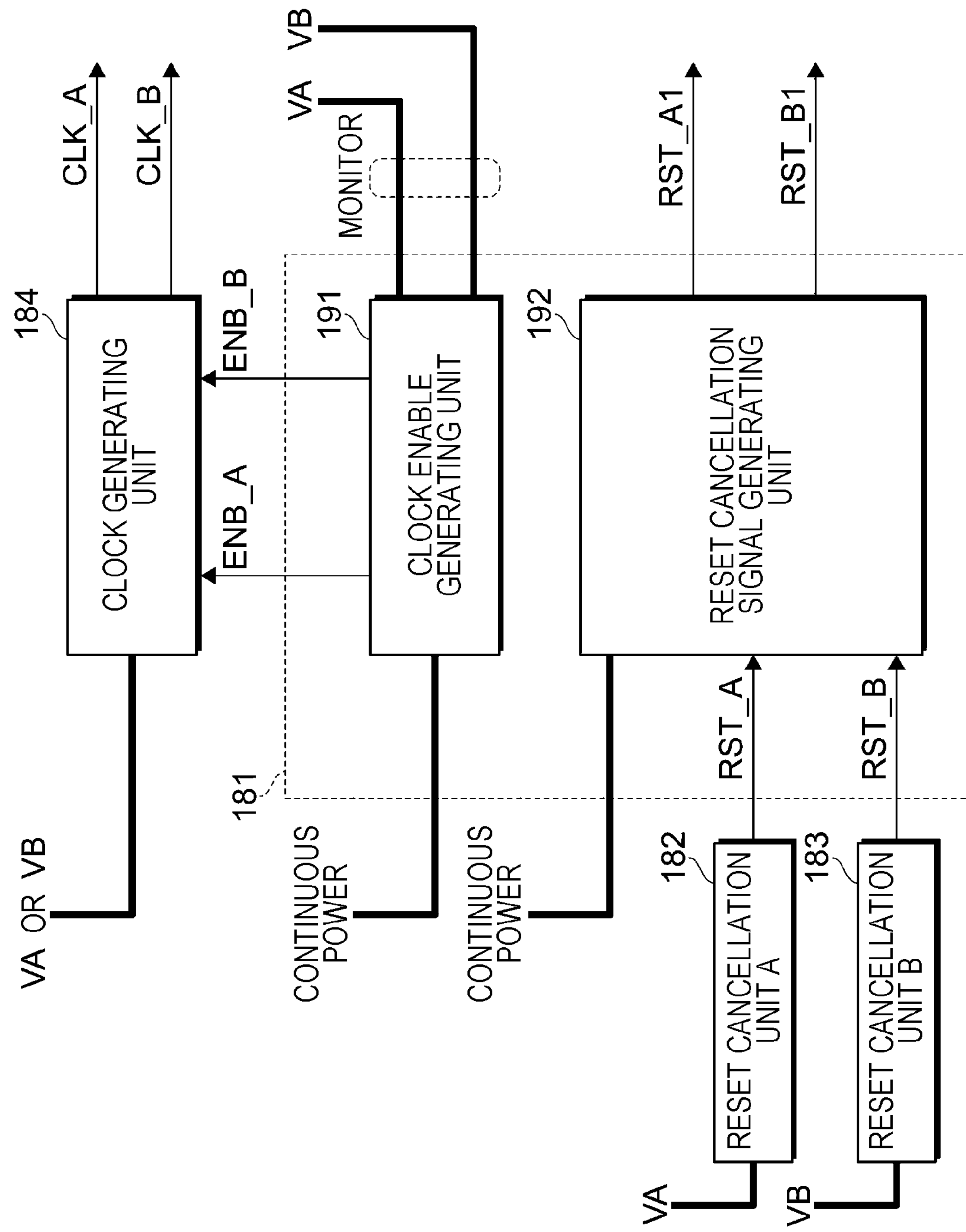
FIG. 6 is a view for explaining an internal configuration of a timing management unit according to Configuration Example 2.

FIG. 6 is a view for explaining an internal configuration of the timing management unit 181 according to Configuration Example 2.

In FIG. 5, parts corresponding to parts of FIG. 3 are given corresponding reference signs. In FIG. 6, parts corresponding to parts of FIG. 4 are given corresponding reference signs.

In this configuration example, the second reset cancellation signal RST_A1 is given to the controller A, and the second reset cancellation signal RST_B1 is given to the controller B. That is, a reset cancellation signal is prepared for each controller.

Also in this configuration example, the clock management unit 170 includes the timing management unit 181 and the clock generating unit 184.

The timing management unit 181 also operates by using continuous power and generates the clock enable signal ENB_A for the controller A and the clock enable signal ENB_B for the controller B by using the clock enable generating unit 191.

Operation of the clock enable generating unit 191 and the clock generating unit 184 is identical to that described in Configuration Example 1, and therefore description thereof is omitted.

The configuration of the reset cancellation management unit 171 is identical to that in the configuration example 1. That is, the reset cancellation management unit 171 includes the reset cancellation unit A (182) that generates the first reset cancellation signal RST_A for the controller A, the reset cancellation unit B (183) that generates the first reset cancellation signal RST_B for the controller B, and the timing management unit 181 that manages output timings of the second reset cancellation signals RST_A1 and RST_B1.

Also in this configuration example, the reset cancellation unit A (182) changes the first reset cancellation signal RST_A to an ON state after a predetermined period upon detection of supply of the power VA. Similarly, the reset cancellation unit B (183) changes the first reset cancellation signal RST_B to an ON state after a predetermined period upon detection of supply of the power VB.

The first reset cancellation signals RST_A and RST_B are given to the reset cancellation signal generating unit 192 of the timing management unit 181.

Operation of the reset cancellation signal generating unit 192 according to the present exemplary embodiment varies depending on power used by the clock generating unit 184.

In a case where the clock generating unit 184 operates by using the power VA, the timing management unit 181 outputs the first reset cancellation signal RST_A as it is as the second reset cancellation signal RST_A1 and outputs a logical product (negative logical sum) of the first reset cancellation signal RST_A and the first reset cancellation signal RST_B as the second reset cancellation signal RST_B1.

This is because the second reset cancellation signal RST_A1 for the controller A can be output without start of supply of the power VB since output of the clock signal CLK_A for the controller A starts upon supply of the power VA. Meanwhile, output of the second reset cancellation signal RST_B1 for the controller B is delayed until start of supply of both of the power VA and the power VB.

In a case where the clock generating unit 184 operates by using the power VB, the timing management unit 181 outputs the first reset cancellation signal RST_B as it is as the second reset cancellation signal RST_B1 and outputs a logical product (negative logical sum) of the first reset cancellation signal RST_A and the first reset cancellation signal RST_B as the second reset cancellation signal RST_A1.

This is because the second reset cancellation signal RST_B for the controller B can be output without start of supply of the power VA since output of the clock signal CLK_B for the controller B starts upon supply of the power VB. Meanwhile, output of the second reset cancellation signal RST_A1 for the controller A is delayed until start of supply of both of the power VA and the power VB.

Configuration Example 3

Figure 7:
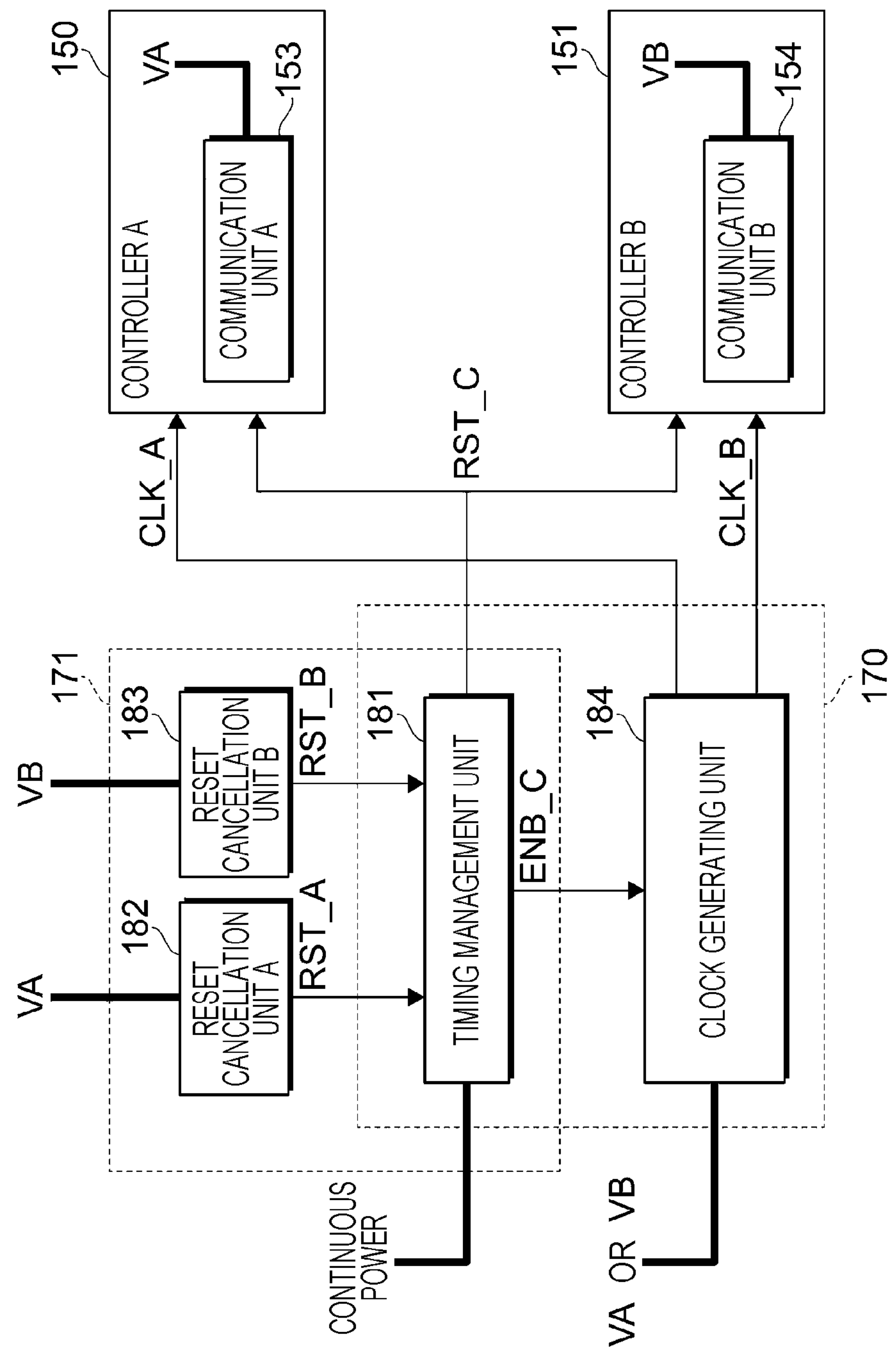
FIG. 7 is a view for explaining an example of configurations of a clock management unit and a reset cancellation management unit in a case where individual clock signals are supplied and a common reset cancellation signal is supplied.

FIG. 7 is a view for explaining an example of configurations of the clock management unit 170 and the reset cancellation management unit 171 in a case where individual clock signals are supplied and a common reset cancellation signal is supplied.

Figure 8:
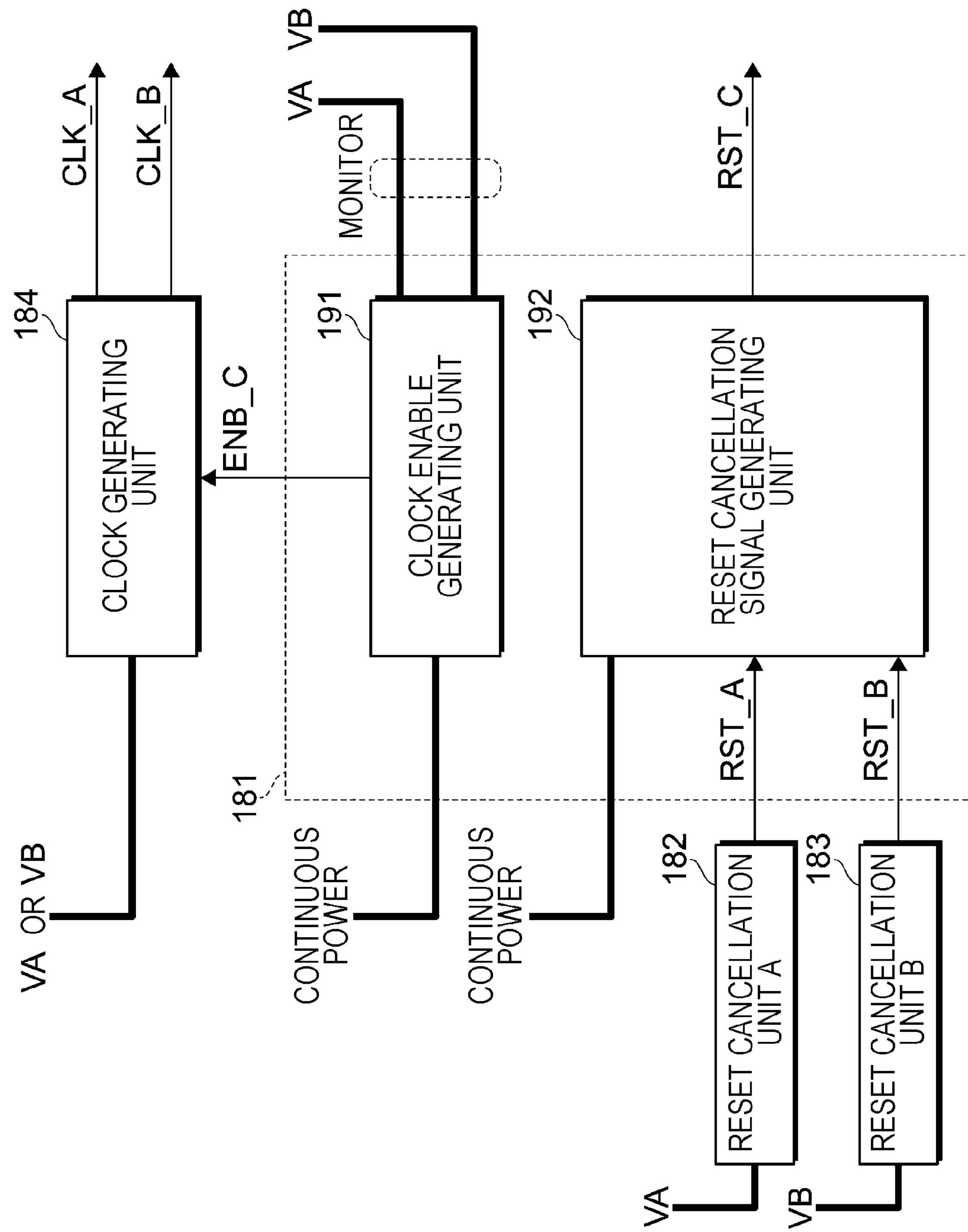
FIG. 8 is a view for explaining an internal configuration of a timing management unit according to Configuration Example 1.

FIG. 8 is a view for explaining an internal configuration of the timing management unit 181 according to Configuration Example 3.

In FIG. 7, parts corresponding to parts of FIG. 3 are given corresponding reference signs. In FIG. 8, parts corresponding to parts of FIG. 4 are given corresponding reference signs.

A difference of this configuration example from Configuration Example 1 (see FIG. 3) is that a common enable signal ENB_C is used for generation of the clock signal CLK_A for the controller A and the clock signal CLK_B for the controller B.

In this configuration example, the clock enable generating unit 191 changes the common clock enable signal ENB_C supplied to the clock generating unit 184 to an ON state after start of supply of both of the power VA and the power VB.

The clock generating unit 184 in this configuration example starts output of the clock signal CLK_A for the controller A and output of the clock signal CLK_B for the controller B concurrently when the clock enable signal ENB_C changes to an ON state.

Even in a case where the clock enable signal ENB_A for the controller A and the clock enable signal ENB_B for the controller B are separately generated as in Configuration Example 1, operation similar to that in Configuration Example 3 can be performed by causing the clock generating unit 184 to start output of the clock signal CLK_A for the controller A and output of the clock signal CLK_B for the controller B when a later clock enable signal is input.

Operation of the reset cancellation unit A (182), the reset cancellation unit B (183), and the reset cancellation signal generating unit 192 is identical to that in Configuration Example 1, and therefore description thereof is omitted.

EXAMPLES

The following describes specific examples of the configuration examples 1 to 3.

Example 1: Case Where Clock Generating Unit 184 Operates by Using Power VA FIG. 9 is a diagram illustrating an example of a hardware configuration of a control system according to Example 1.

Figure 9:
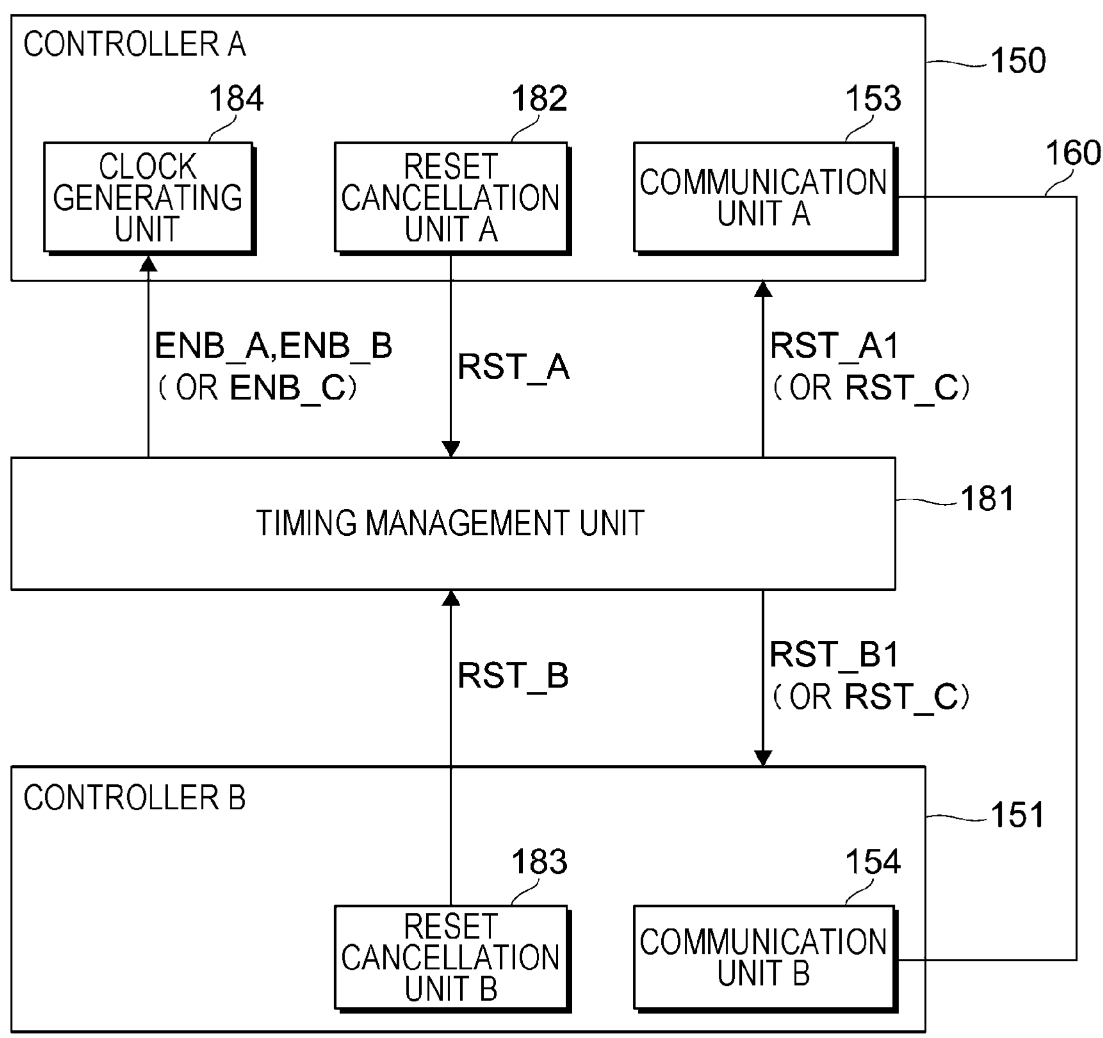
FIG. 9 is a diagram illustrating an example of a hardware configuration of a control system according to Example 1.

In FIG. 9, parts corresponding to parts of FIGS. 3 through 8 are given corresponding reference signs.

In FIG. 9, the clock generating unit 184 and the reset cancellation unit A (182) are provided in the controller A, and the reset cancellation unit B (183) is provided in the controller B.

Note, however, that the timing management unit 181, the reset cancellation unit A (182), the reset cancellation unit B (183), and the clock generating unit 184 may be disposed in any way, provided that the condition that the clock generating unit 184 operates by using the power VA is satisfied.

Example 1-1

Figure 10:
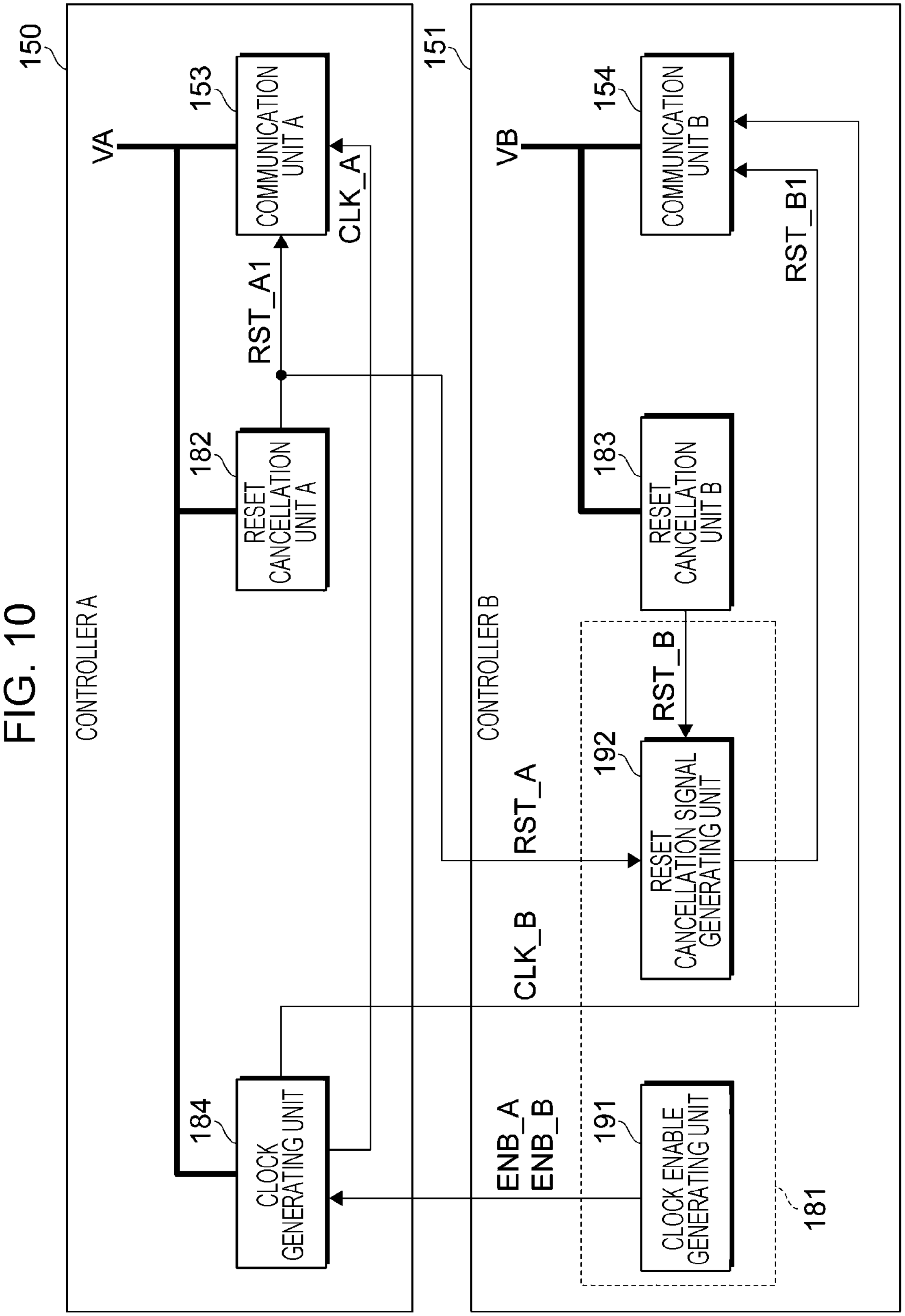
FIG. 10 is a diagram illustrating an example of a hardware configuration according to Example 1-1.

FIG. 10 is a diagram illustrating an example of a hardware configuration according to Example 1-1.

In FIG. 10, parts corresponding to parts of FIG. 9 are given corresponding reference signs.

In the case of the hardware configuration according to Example 1-1, the timing management unit 181 (the clock enable generating unit 191 and the reset cancellation signal generating unit 192) is provided in the controller B, and the clock signals CLK_A and CLK_B and the second reset cancellation signals RST_A1 and RST_B1 are individually controlled. This hardware configuration is an example of Configuration Example 2 (see FIG. 5).

FIGS. 11A through 11K are views for explaining output timings of various signals in a case where the power VA is turned on earlier than the power VB.

Figures 11A, 11B, 11C, 11D, 11E, 11F, 11G, 11H, 11I, 11J, 11K:
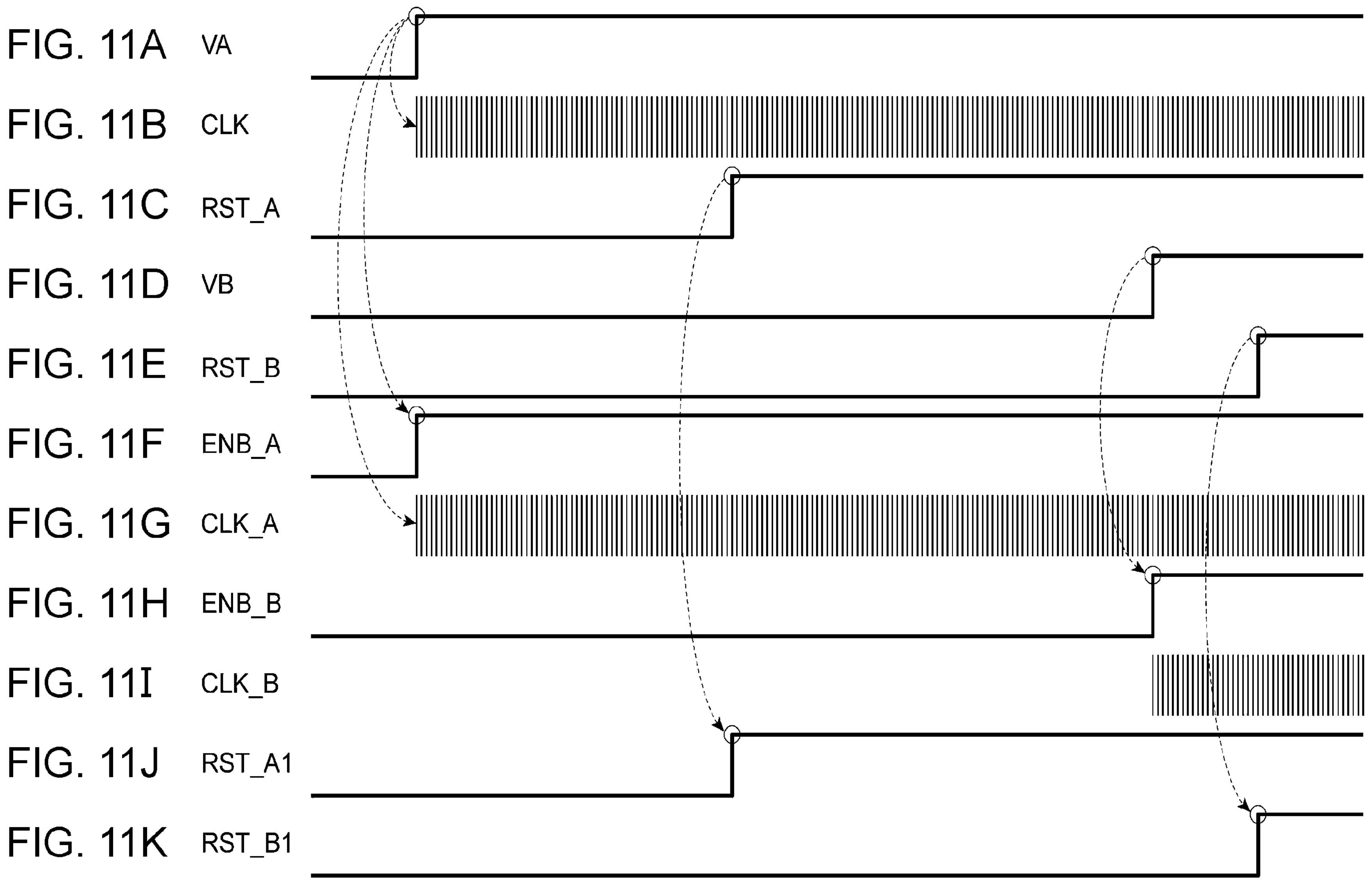
FIGS. 11A, 11B, 11C, 11D, 11E, 11F, 11G, 11H, 11I, 11J, and 11K are diagrams illustrating output timings of various signals in a case where power VA is turned on earlier than power VB.

FIG. 11A illustrates a waveform of the power VA, FIG. 11B illustrates a waveform of a basic clock CLK, FIG. 11C illustrates a waveform of the first reset cancellation signal RST_A for the controller A, FIG. 11D illustrates a waveform of the power VB, FIG. 11E illustrates a waveform of the first reset cancellation signal RST_B for the controller B, FIG. 11F illustrates a waveform of the clock enable signal ENB_A for the controller A, FIG. 11G illustrates a waveform of the clock signal CLK_A supplied to the controller A, FIG. 11H illustrates a waveform of the clock enable signal ENB_B for the controller B, FIG. 11I illustrates a waveform of the clock signal CLK_B supplied to the controller B, FIG. 11J illustrates a waveform of the second reset cancellation signal RST_A1 supplied to the controller A, and FIG. 11*k* illustrates a waveform of the second reset cancellation signal RST_B1 supplied to the controller B.

As illustrated in FIGS. 11A through 11K, first, the power VA (see FIG. 11A) changes to an ON state.

This change is detected by the clock enable generating unit 191 (see FIG. 10) provided in the controller B operating by using continuous power.

The clock enable generating unit 191 that has detected the change of the power VA to an ON state changes the clock enable signal ENB_A for the controller A (see FIG. 11F) to an ON state.

The clock generating unit 184 (see FIG. 10) that operates while receiving the power VA starts output of the clock signal CLK_A (see FIG. 11G) upon receipt of the clock enable signal ENB_A.

Accordingly, supply of the clock signal CLK_A to the controller A is later than supply of the power VA.

The clock generating unit 184 includes a clock source (not illustrated). The clock source generates the basic clock CLK (see FIG. 11B) in association with supply of power.

The change of the power VA to an ON state is also detected by the reset cancellation unit A (182) (see FIG. 10) of the controller A.

The reset cancellation unit A (182) changes the first reset cancellation signal RST_A (see FIG. 11C) to an ON state later by a predetermined period than detection of supply (ON state) of the power VA.

Accordingly, supply of the second reset cancellation signal RST_A1 (see FIG. 11J) from the reset cancellation signal generating unit 192 (see FIG. 10) operating by using continuous power to the communication unit A (153) of the controller A is later than the clock signal CLK_A.

FIG. 10 illustrates a case where the first reset cancellation signal RST_A is used as the second reset cancellation signal RST_A1 as it is.

As described above, the communication unit A (153) of the controller A receives the clock signal CLK_A after start of supply of the power VA and then receives the second reset cancellation signal RST_A1.

Accordingly, the communication unit A (153) of the controller A starts operation normally.

Then, the communication unit A (153) shifts to a state where an initialization process is executable and starts output of a link pulse.

In FIGS. 11A through 11K, the power VB for the controller B (see FIG. 11D) turns on later than the power VA.

This change is detected by the clock enable generating unit 191 (see FIG. 10) provided in the controller B operating by using continuous power.

The clock enable generating unit 191 that has detected the change of the power VB to an ON state changes the clock enable signal ENB_B for the controller B (see FIG. 11H) to an ON state.

The clock generating unit 184 (see FIG. 10) starts output of the clock signal CLK_B (see FIG. 11I) upon receipt of the clock enable signal ENB_B since the clock generating unit 184 has already started operation upon supply of the power VA.

Accordingly, supply of the clock signal CLK_B to the controller B is later than supply of the power VB.

The change of the power VB to an ON state is also detected by the reset cancellation unit B (183) (see FIG. 10) of the controller B.

The reset cancellation unit B (183) changes the first reset cancellation signal RST_B (see FIG. 11E) to an ON state later by a predetermined period than detection of supply (ON state) of the power VB.

Accordingly, supply of the second reset cancellation signal RST_B1 (see FIG. 11K) from the reset cancellation signal generating unit 192 to the communication unit B (154) of the controller B is later than supply of the clock signal CLK_B.

As described above, the communication unit B (154) of the controller B receives the clock signal CLK_B after start of supply of the power VB and then receives the second reset cancellation signal RST_B1.

Accordingly, the communication unit B (154) of the controller B starts operation normally.

Then, the communication unit B (154) shifts to a state where an initialization process is executable and starts output of a link pulse.

As a result, a link is established between the communication unit A (153) and the communication unit B (154). This enables communication between the controller A and the controller B.

FIGS. 12A through 12K are views for explaining output timings of various signals in a case where the power VA is turned on later than the power VB.

Figures 12A, 12B, 12C, 12D, 12E, 12F, 12G, 12H, 12I, 12J, 12K:
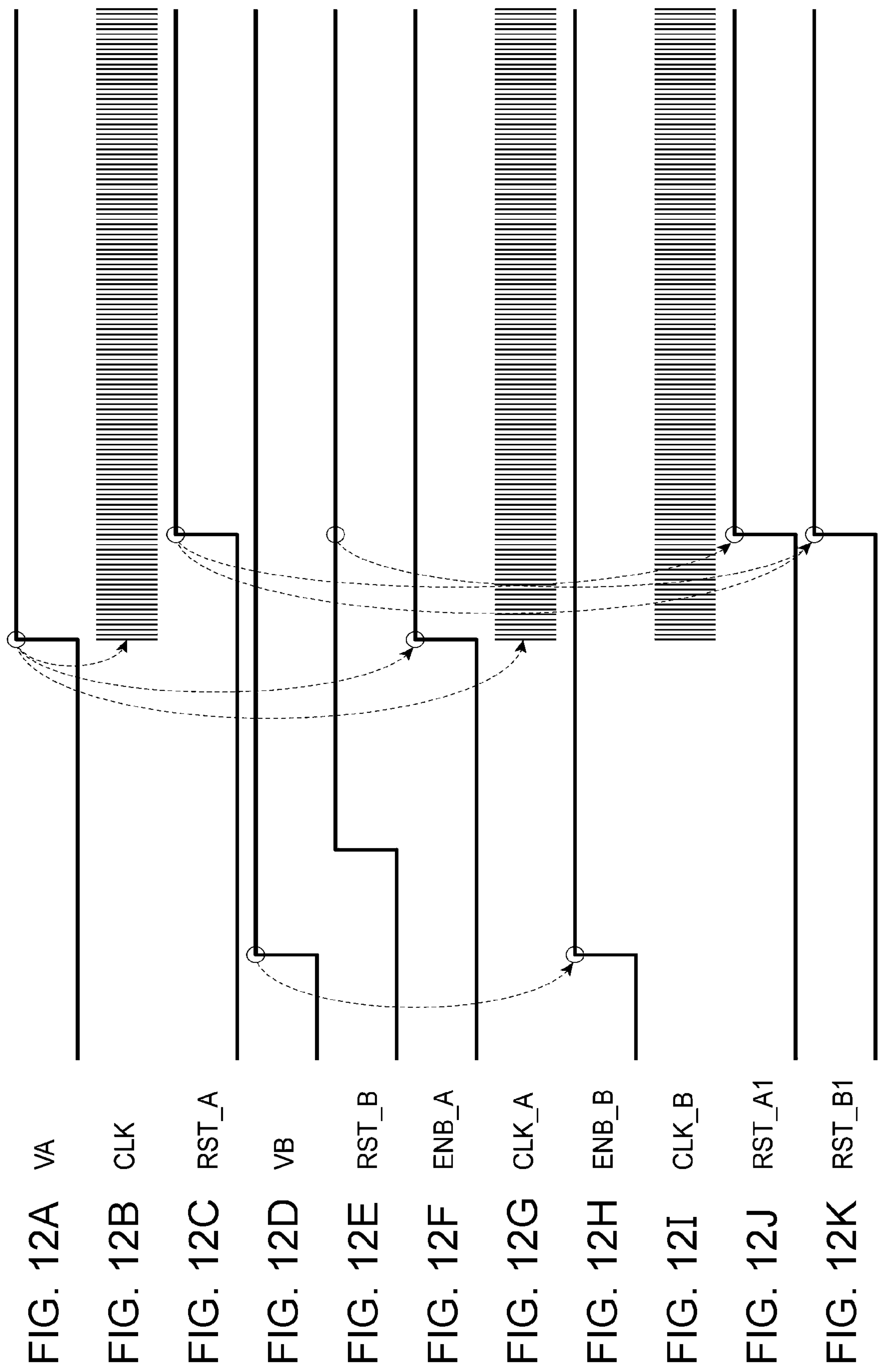
FIGS. 12A, 12B, 12C, 12D, 12E, 12F, 12G, 12H, 12I, 12J, and 12K are diagrams illustrating output timings of various signals in a case where power VA is turned on later than power VB.

FIG. 12A illustrates a waveform of the power VA, FIG. 12B illustrates a waveform of the basic clock CLK, FIG. 12C illustrates a waveform of the first reset cancellation signal RST_A for the controller A, FIG. 12D illustrates a waveform of the power VB, FIG. 12E illustrates a waveform of the first reset cancellation signal RST_B for the controller B, FIG. 12F illustrates a waveform of the clock enable signal ENB_A for the controller A, FIG. 12G illustrates a waveform of the clock signal CLK_A supplied to the controller A, FIG. 12H illustrates a waveform of the clock enable signal ENB_B for the controller B, FIG. 12I illustrates a waveform of the clock signal CLK_B supplied to the controller B, FIG. 12J illustrates a waveform of the second reset cancellation signal RST_A1 supplied to the controller A, and FIG. 12K illustrates a waveform of the second reset cancellation signal RST_B1 supplied to the controller B.

As illustrated in FIGS. 12A through 12K, first, the power VB (see FIG. 12D) changes to an ON state.

This change is detected by the clock enable generating unit 191 (see FIG. 10) provided in the controller B operating by using continuous power.

The clock enable generating unit 191 that has detected the change of the power VB to an ON state changes the clock enable signal ENB_B for the controller B (see FIG. 12H) to an ON state.

This clock enable signal ENB_B is supplied to the clock generating unit 184 (see FIG. 10), but the clock generating unit 184 that operates by using the power VA is not operating.

Accordingly, output of the clock signal CLK_B (see FIG. 12I) does not start even in a case where the power VB is in an ON state.

The change of the power VB to an ON state is also detected by the reset cancellation unit B (183) (see FIG. 10) of the controller B.

The reset cancellation unit B (183) changes the first reset cancellation signal RST_B (see FIG. 12E) to an ON state later by a predetermined period than detection of supply (ON state) of the power VB.

This first reset cancellation signal RST_B is given to the reset cancellation signal generating unit 192 (see FIG. 10) operating by using continuous power.

However, the second reset cancellation signal RST_B1 is still in an OFF state since the reset cancellation signal generating unit 192 outputs, as the second reset cancellation signal RST_B1 (see FIG. 12K), a logical product (negative logical sum) of the first reset cancellation signal RST_B for the controller B (see FIG. 12E) and the first reset cancellation signal RST_A for the controller A (see FIG. 12C).

That is, the clock signal CLK_B (see FIG. 12I) and the second reset cancellation signal RST_B1 (see FIG. 12K) are not supplied to the controller B before supply of the power VA.

In FIGS. 12A through 12K, the power VA for the controller A (see FIG. 12A) is turned on later than the power VB.

When the power VA changes to an ON state, the clock generating unit 184 (see FIG. 10) provided in the controller A starts generation of the basic clock CLK (see FIG. 12B).

As described above, the clock enable signal ENB_B (see FIG. 12H) that is in an ON state has been already given to the clock generating unit 184. Accordingly, the clock generating unit 184 starts output of the clock signal CLK_B for the controller B (see FIG. 12I) concurrently with generation of the basic clock.

Accordingly, supply of the clock signal CLK_B to the controller B is later than supply of the power VB.

The change of the power VA to an ON state is detected by the clock enable generating unit 191 (see FIG. 10) provided in the controller B operating by using continuous power.

The clock enable generating unit 191 that has detected the change of the power VA to an ON state changes the clock enable signal ENB_A for the controller A (see FIG. 12F) to an ON state.

The clock generating unit 184 to which the clock enable signal ENB_A in an ON state has been given starts output of the clock signal CLK_A for the controller A (see FIG. 12G) in synchronization with start of supply of the power VA.

Accordingly, supply of the clock signal CLK_A to the controller A is later than supply of the power VA.

The change of the power VA to an ON state is also detected by the reset cancellation unit A (182) (see FIG. 10) provided in the controller A.

The reset cancellation unit A (182) changes the first reset cancellation signal RST_A (see FIG. 12C) to an ON state later by a predetermined period than detection of supply (ON state) of the power VA.

This first reset cancellation signal RST_A is given to the reset cancellation signal generating unit 192 (see FIG. 10).

As described above, the reset cancellation signal generating unit 192 receives the first reset cancellation signal RST_B for the controller B that has been already changed to an ON state. Accordingly, the second reset cancellation signal RST_A1 for the controller A (see FIG. 12J) and the second reset cancellation signal RST_B1 for the controller B (see FIG. 12K) change to an ON state in synchronization with the change of the first reset cancellation signal RST_A for the controller A to an ON state.

Accordingly, supply of the second reset cancellation signal RST_A1 from the reset cancellation signal generating unit 192 to the communication unit A (153) provided in the controller A is later than supply of the clock signal CLK_A. Furthermore, supply of the second reset cancellation signal RST_B1 from the reset cancellation signal generating unit 192 to the communication unit B (154) provided in the controller B is later than supply of the clock signal CLK_B.

Accordingly, both of the communication unit A (153) of the controller A and the communication unit B (154) of the controller B start operation normally.

Then, the communication unit A (153) and the communication unit B (154) shift to a state where an initialization process is executable and start output of a link pulse.

As a result, a link is established between the communication unit A (153) and the communication unit B (154). This enables communication between the controller A and the controller B.

Example 1-2

Figure 13:
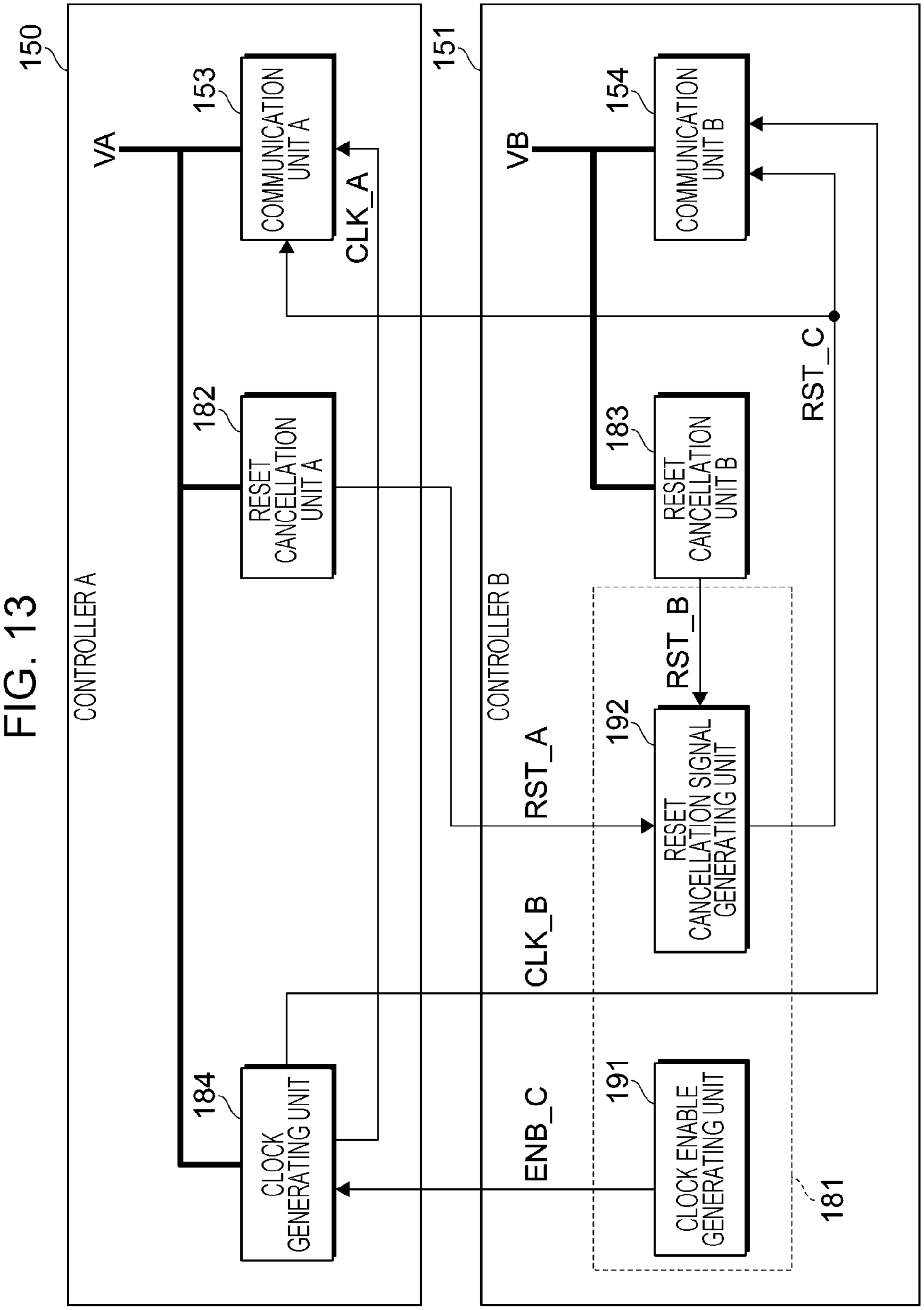
FIG. 13 is a diagram illustrating an example of a hardware configuration according to Example 1-2.

FIG. 13 is a diagram illustrating an example of a hardware configuration according to Example 1-2.

In FIG. 13, parts corresponding to parts of FIG. 9 are given corresponding reference signs.

In the hardware configuration according to Example 1-2, the timing management unit 181 (the clock enable generating unit 191 and the reset cancellation signal generating unit 192) is provided in the controller B.

In the hardware configuration according to Example 1-2, only the clock signals CLK_A and CLK_B are individually controlled unlike Example 1-1 (see FIG. 10).

That is, the controller A and the controller B are reset by a common second reset cancellation signal RST_C.

In this example, a common clock enable signal ENB_C is used for generation of the common second reset cancellation signal RST_C. Accordingly, the hardware configuration illustrated in FIG. 13 is an example of Configuration Example 3 (see FIG. 7).

Control identical to that of Configuration Example 3 can be performed even in a case where the individual clock enable signals ENB_A and ENB_B are prepared as in Configuration Example 1 (see FIG. 3).

For example, operation identical to the operation using the common clock enable signal ENB_C is realized by changing the clock enable signal ENB_A and the clock enable signal ENB_B to an ON state at the same timing.

FIGS. 14A through 14K are views for explaining output timings of various signals in a case where the power VA is turned on earlier than the power VB.

FIG. 14A illustrates a waveform of the power VA, FIG. 14B illustrates a waveform of a basic clock CLK, FIG. 14C illustrates a waveform of the first reset cancellation signal RST_A for the controller A, FIG. 14D illustrates a waveform of the power VB, FIG. 14E illustrates a waveform of the first reset cancellation signal RST_B for the controller B, FIG. 14F illustrates a waveform of the common clock enable signal ENB_C, FIG. 14G illustrates a waveform of the clock signal CLK_A supplied to the controller A, FIG. 14H illustrates a waveform of the common clock enable signal ENB_C, FIG. 14I illustrates a waveform of the clock signal CLK_B supplied to the controller B, FIG. 14J illustrates a waveform of the common second reset cancellation signal RST_C, and FIG. 14K illustrates a waveform of the common second reset cancellation signal RST_C.

FIGS. 14A through 14K illustrate an example in which the waveform of the common clock enable signal ENB_C is allocated to the clock enable signal ENB_A for the controller A and the clock enable signal ENB_B for the controller B, assuming a case where operation identical to the operation of Configuration Example 3 is performed by using Configuration Example 1 as described above.

That is, the waveform of the common clock enable signal ENB_C is illustrated at two places (FIGS. 14F and 14H).

Furthermore, FIGS. 14A through 14K illustrate an example in which the waveform of the common second reset cancellation signal RST_C is allocated to the second reset cancellation signal RST_A1 for the controller A and the second reset cancellation signal RST_B1 for the controller B, assuming a case where second reset cancellation signals are individually controlled as in Configuration Example 2.

That is, the waveform of the common second reset cancellation signal RST_C is illustrated at two places (FIGS. 14J and 14K).

As illustrated in FIGS. 14A through 14K, first, the power VA (see FIG. 14A) changes to an ON state.

This change is detected by the clock enable generating unit 191 (see FIG. 13) of the controller B operating by using continuous power.

However, both of the power VA and the power VB need be in an ON state in order that the common clock enable signal ENB_C changes to an ON state.

Accordingly, the common clock enable signal ENB_C remains in an OFF state even in a case where only the power VA changes to an ON state.

Meanwhile, the clock generating unit 184 operates by using the power VA for the controller A. Accordingly, when the power VA changes to an ON state, generation of the basic clock CLK (see FIG. 14B) starts. However, this basic clock is not supplied to an outside.

The change of the power VA to an ON state is also detected by the reset cancellation unit A (182) (see FIG. 13) provided in the controller A.

The reset cancellation unit A (182) changes the first reset cancellation signal RST_A (see FIG. 14C) to an ON state later by a predetermined period than detection of supply (ON state) of the power VA.

The first reset cancellation signal RST_A for the controller A that has changed to an ON state is given to the reset cancellation signal generating unit 192 operating by using continuous power.

However, both of the first reset cancellation signal RST_A for the controller A and the first reset cancellation signal RST_B for the controller B need be in an ON state in order that the common second reset cancellation signal RST_C (see FIGS. 14J and 14K) changes to an ON state.

Accordingly, even in a case where only the power VA changes to an ON state, the common second reset cancellation signal RST_C remains in an OFF state.

Eventually, the power VB for the controller B (see FIG. 14D) changes to an ON state.

This change is detected by the clock enable generating unit 191 (see FIG. 13) provided in the controller B operating by using continuous power.

As described above, an ON state of the power VA has been already detected by the clock enable generating unit 191.

Accordingly, the clock enable generating unit 191 changes the common clock enable signal ENB_C (see FIGS. 14F and 14H) to an ON state at a timing at which the change of the power VB to an ON state is detected.

When the common clock enable signal ENB_C changes to an ON state, the clock generating unit 184 (see FIG. 13) that has already started operation starts output of the clock signal CLK_A for the controller A (see FIG. 14G) and the clock signal CLK_B for the controller B (see FIG. 14I).

Accordingly, supply of the clock signal CLK_A to the controller A is later than supply of the power VA.

Similarly, supply of the clock signal CLK_B to the controller B is later than supply of the power VB.

When the power VB changes to an ON state, the reset cancellation unit B (183) provided in the controller B changes the first reset cancellation signal RST_B (see FIG. 14E) to an ON state later by a predetermined period than detection of supply (ON state) of the power VB.

The first reset cancellation signal RST_A for the controller A is already in an ON state at a timing at which the first reset cancellation signal RST_B for the controller B changes to an ON state.

Accordingly, the reset cancellation signal generating unit 192 (see FIG. 13) changes the common second reset cancellation signal RST_C (see FIGS. 14J and 14K) to an ON state at the timing at which the first reset cancellation signal RST_B for the controller B changes to an ON state.

Accordingly, supply of the common second reset cancellation signal RST_A to the communication unit A (153) for the controller A is later than supply of the clock signal CLK_A.

Similarly, supply of the common second reset cancellation signal RST_B to the communication unit B (154) of the controller B is later than supply of the clock signal CLK_B.

Accordingly, both of the communication unit A (153) of the controller A and the communication unit B (154) of the controller B start operation normally.

Then, the communication unit A (153) and the communication unit B (154) shift to a state where an initialization process is executable and starts output of a link pulse.

As a result, a link is established between the communication unit A (153) and the communication unit B (154). This enables communication between the controller A and the controller B.

FIGS. 15A through 15K are views for explaining output timings of various signals in a case where the power VA is turned on later than the power VB.

Figures 15A, 15B, 15C, 15D, 15E, 15F, 15G, 15H, 15I, 15J, 15K:
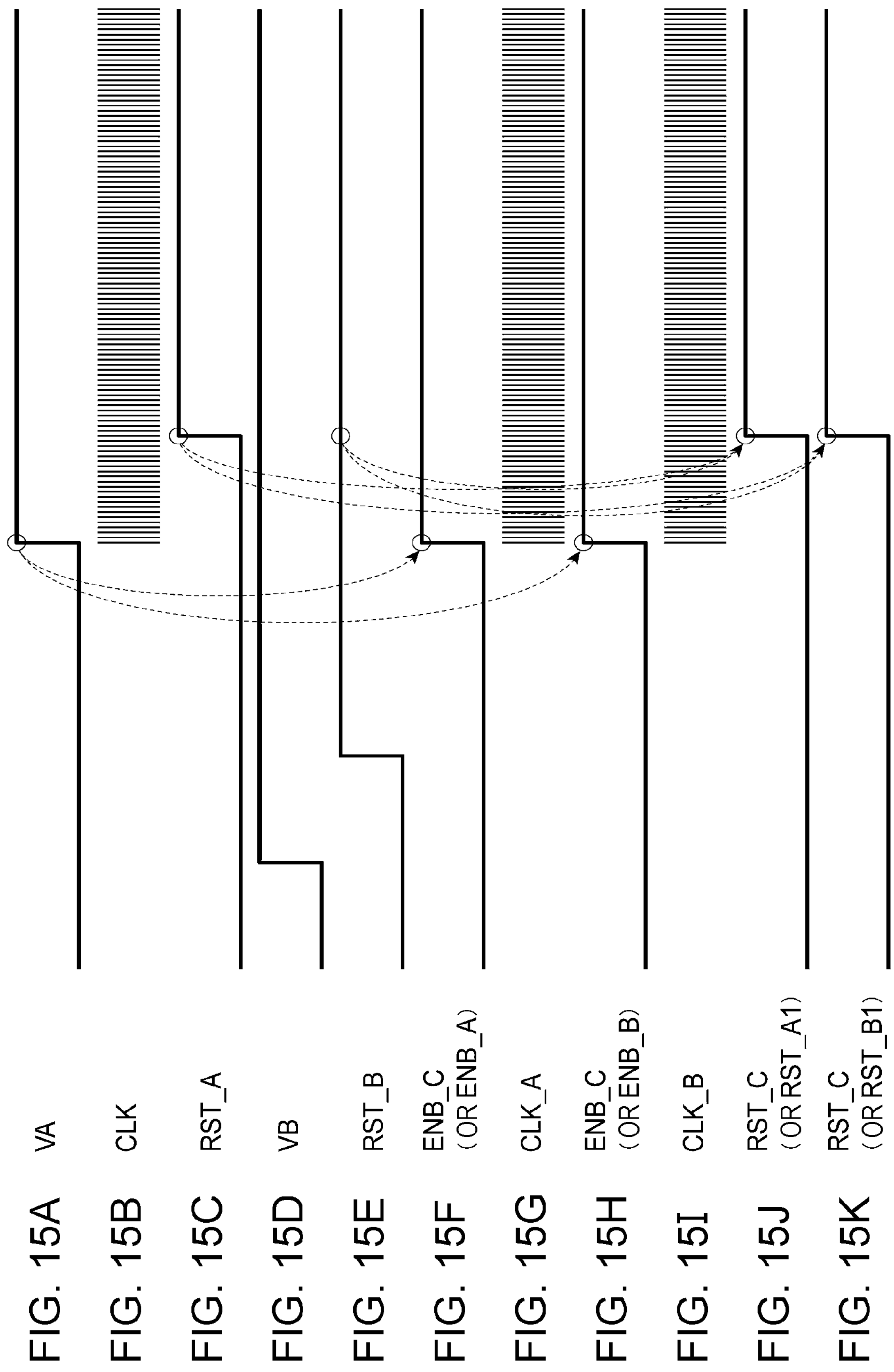
FIGS. 15A, 15B, 15C, 15D, 15E, 15F, 15G, 15H, 15I, 15J, and 15K are diagrams illustrating output timings of various signals in a case where power VA is turned on later than power VB.

FIG. 15A illustrates a waveform of the power VA, FIG. 15B illustrates a waveform of a basic clock CLK, FIG. 15C illustrates a waveform of the first reset cancellation signal RST_A for the controller A, FIG. 15D illustrates a waveform of the power VB, FIG. 15E illustrates a waveform of the first reset cancellation signal RST_B for the controller B, FIG. 15F illustrates a waveform of the common clock enable signal ENB_C, FIG. 15G illustrates a waveform of the clock signal CLK_A supplied to the controller A, FIG. 15H illustrates a waveform of the common clock enable signal ENB_C, FIG. 15I illustrates a waveform of the clock signal CLK_B supplied to the controller B, FIG. 15J illustrates a waveform of the common second reset cancellation signal RST_C, and FIG. 15K illustrates a waveform of the common second reset cancellation signal RST_C.

As illustrated in FIGS. 15A through 15K, first, the power VB (see FIG. 15D) changes to an ON state.

This change is detected by the clock enable generating unit 191 (see FIG. 13) provided in the controller B operating by using continuous power.

However, both of the power VA and the power VB need be in an ON state in order that the common clock enable signal ENB_C (see FIGS. 15F and 15H) changes to an ON state.

Accordingly, even in a case where only the power VB changes to an ON state, the common clock enable signal ENB_C remains in an OFF state.

The change of the power VB to an ON state is also detected by the reset cancellation unit B (183) (see FIG. 13) provided in the controller B.

The reset cancellation unit B (183) changes the first reset cancellation signal RST_B (see FIG. 15E) to an ON state later by a predetermined period than detection of supply (ON state) of the power VB.

The first reset cancellation signal RST_B for the controller B that has changed to an ON state is given to the reset cancellation signal generating unit 192 operating by using continuous power.

However, both of the first reset cancellation signal RST_A for the controller A and the first reset cancellation signal RST_B for the controller B need be in an ON state in order that the common second reset cancellation signal RST_C (see FIGS. 15J and 15K) changes to an ON state.

Accordingly, even in a case where only the power VB changes to an ON state, the common second reset cancellation signal RST_C remains in an OFF state.

Eventually, the power VA for the controller A (see FIG. 15A) changes to an ON state.

The clock generating unit 184 operates by using the power VA for the controller A. Accordingly, when the power VA changes to an ON state, generation of the basic clock CLK (see FIG. 15B) starts.

The change of the power VA to an ON state is detected by the clock enable generating unit 191 (see FIG. 13) of the controller B operating by using continuous power.

The power VB is already in an ON state at a timing at which the power VA changes to an ON state.

Accordingly, when the power VA changes to an ON state, the clock enable generating unit 191 changes the common clock enable signal ENB_C (FIGS. 15F and 15H) to an ON state.

As described above, the clock generating unit 184 has started generation of the basic clock CLK.

Accordingly, when the clock enable signal ENB_C changes to an ON state, output of the clock signal CLK_A for the controller A (see FIG. 15G) and output of the clock signal CLK_B for the controller B (see FIG. 15I) start.

Accordingly, supply of the clock signal CLK_A is later than supply of the power VA. Furthermore, supply of the clock signal CLK_B is later than supply of the power VB.

Furthermore, the change of the power VA for the controller A to an ON state is detected by the reset cancellation unit A (182) provided in the controller A.

The reset cancellation unit A (182) changes the first reset cancellation signal RST_A (see FIG. 15C) to an ON state later by a predetermined period than detection of supply (ON state) of the power VA.

At this timing, the first reset cancellation signal RST_B for the controller B (see FIG. 15E) supplied to the reset cancellation signal generating unit 192 (see FIG. 13) is already in an ON state.

Accordingly, the reset cancellation signal generating unit 192 changes the common second reset cancellation signal RST_C (see FIGS. 15J and 15K) to an ON state at the timing at which the first reset cancellation signal RST_A for the controller A changes to an ON state.

Accordingly, the common second reset cancellation signal RST_C that is in an ON state is given to the communication unit A (153) of the controller A after supply of the clock signal CLK_A.

Furthermore, the common second reset cancellation signal RST_C that is in an ON state is given to the communication unit B (154) of the controller B after supply of the clock signal CLK_B.

Accordingly, both of the communication unit A (153) of the controller A and the communication unit B (154) of the controller B starts operation normally.

Then, the communication unit A (153) and the communication unit B (154) shift to a state where an initialization process is executable and starts output of a link pulse.

As a result, a link is established between the communication unit A (153) and the communication unit B (154). This enables communication between the controller A and the controller B.

Example 2: Case Where Clock Generating Unit 184 Operates by Using Power VB FIG. 16 is a diagram illustrating an example of a hardware configuration of a control system according to Example 2.

Figure 16:
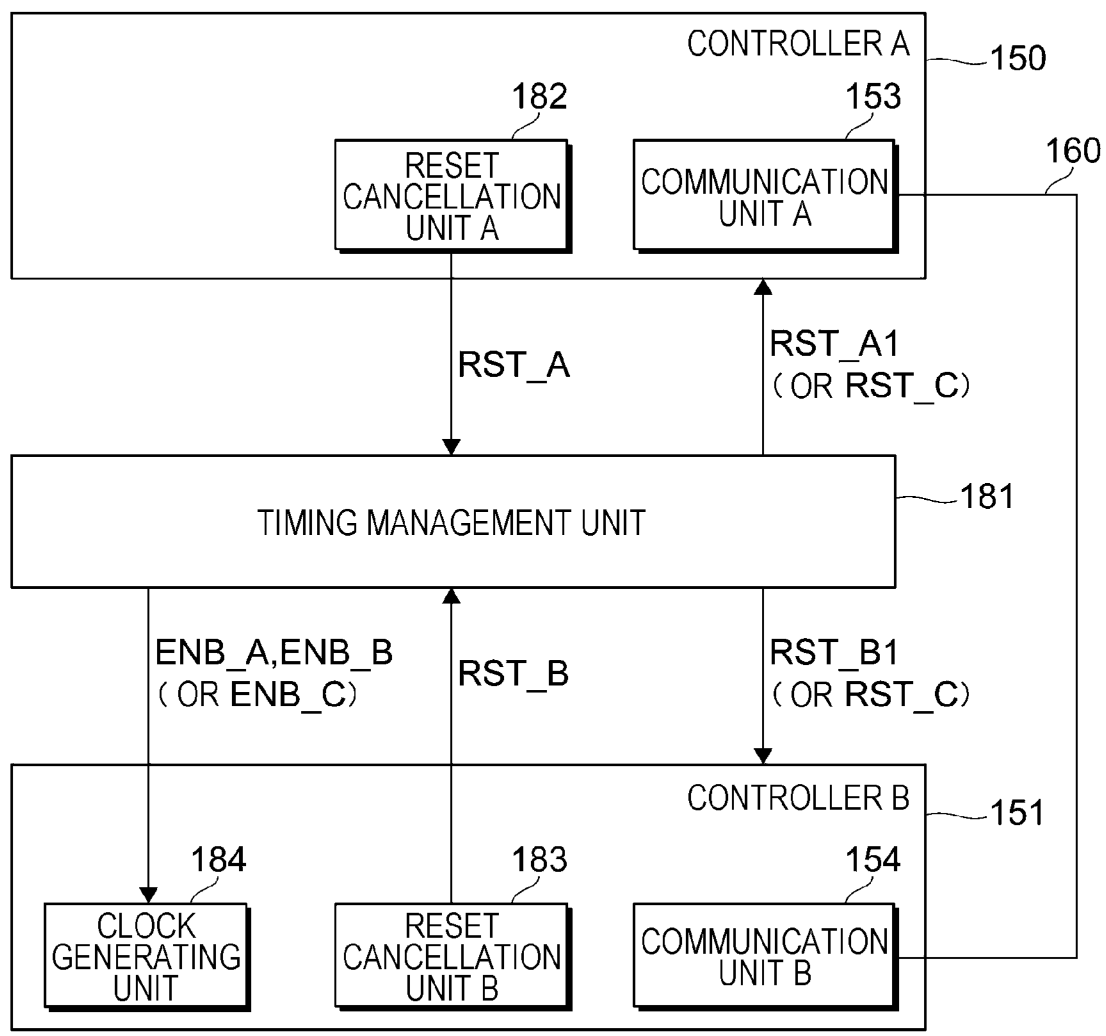
FIG. 16 is a diagram illustrating an example of a hardware configuration of a control system according to Example 2.

In FIG. 16, parts corresponding to parts of FIGS. 3 through 8 are given corresponding reference signs.

In FIG. 16, the reset cancellation unit A (182) is provided in the controller A, and the reset cancellation unit B (183) and the clock generating unit 184 are provided in the controller B.

Note, however, that the timing management unit 181, the reset cancellation unit A (182), the reset cancellation unit B (183), and the clock generating unit 184 may be disposed in any way as long as a condition that the clock generating unit 184 operates by using the power VB is satisfied.

Example 2-1

Figure 17:
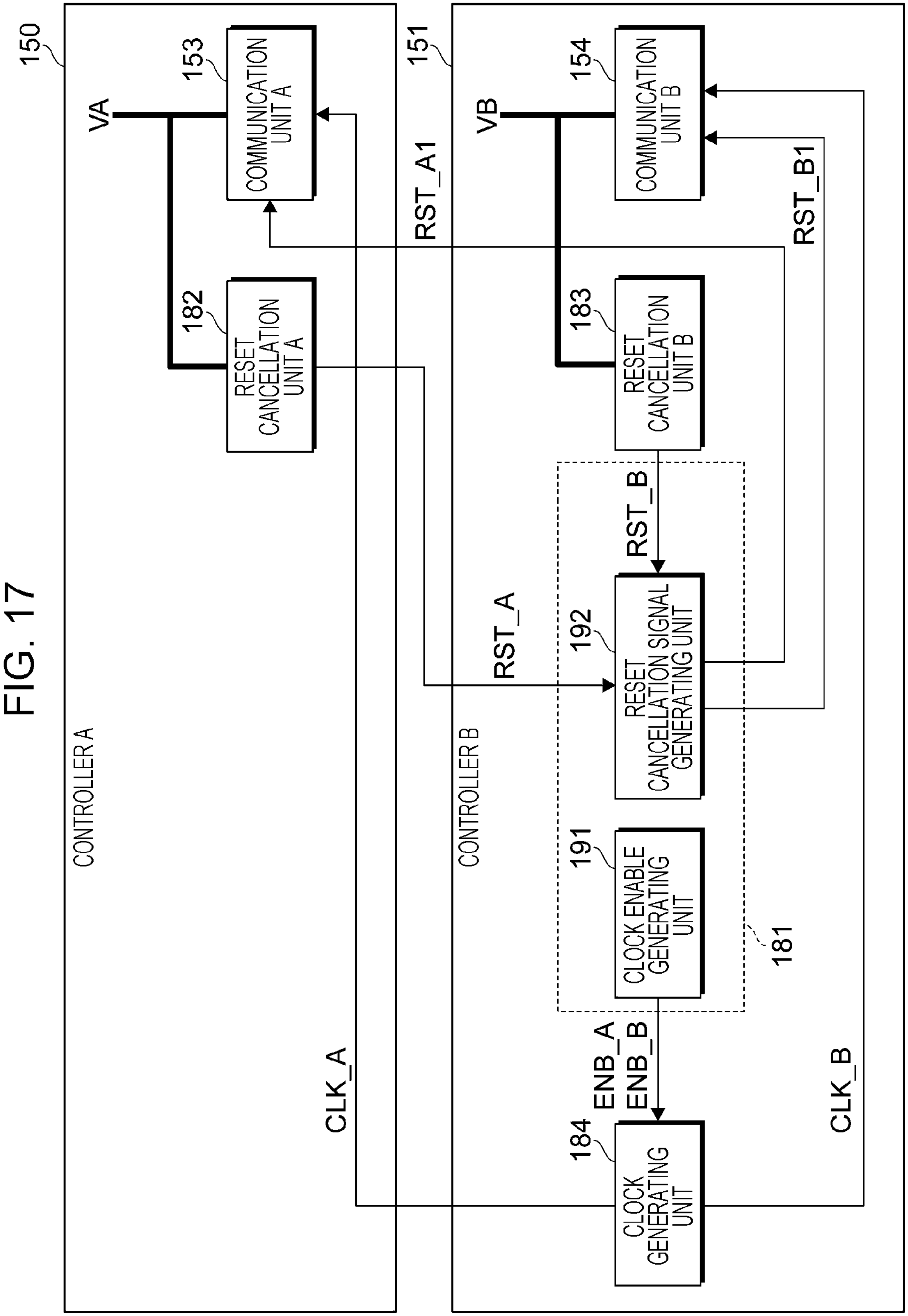
FIG. 17 is a diagram illustrating an example of a hardware configuration according to Example 2-1.

FIG. 17 is a diagram illustrating an example of a hardware configuration according to Example 2-1.

In FIG. 17, parts corresponding to parts of FIG. 16 are given corresponding reference signs.

In the hardware configuration according to Example 2-1, the timing management unit 181 (the clock enable generating unit 191 and the reset cancellation signal generating unit 192) is provided in the controller B, and the clock signals CLK_A and CLK_B and the second reset cancellation signals RST_A1 and RST_B1 are individually controlled.

This hardware configuration is an example of Configuration Example 2 (see FIG. 5).

FIGS. 18A through 18K are views for explaining output timings of various signals in a case where the power VA is turned on earlier than the power VB.

Figures 18A, 18B, 18C, 18D, 18E, 18F, 18G, 18H, 18I, 18J, 18K:
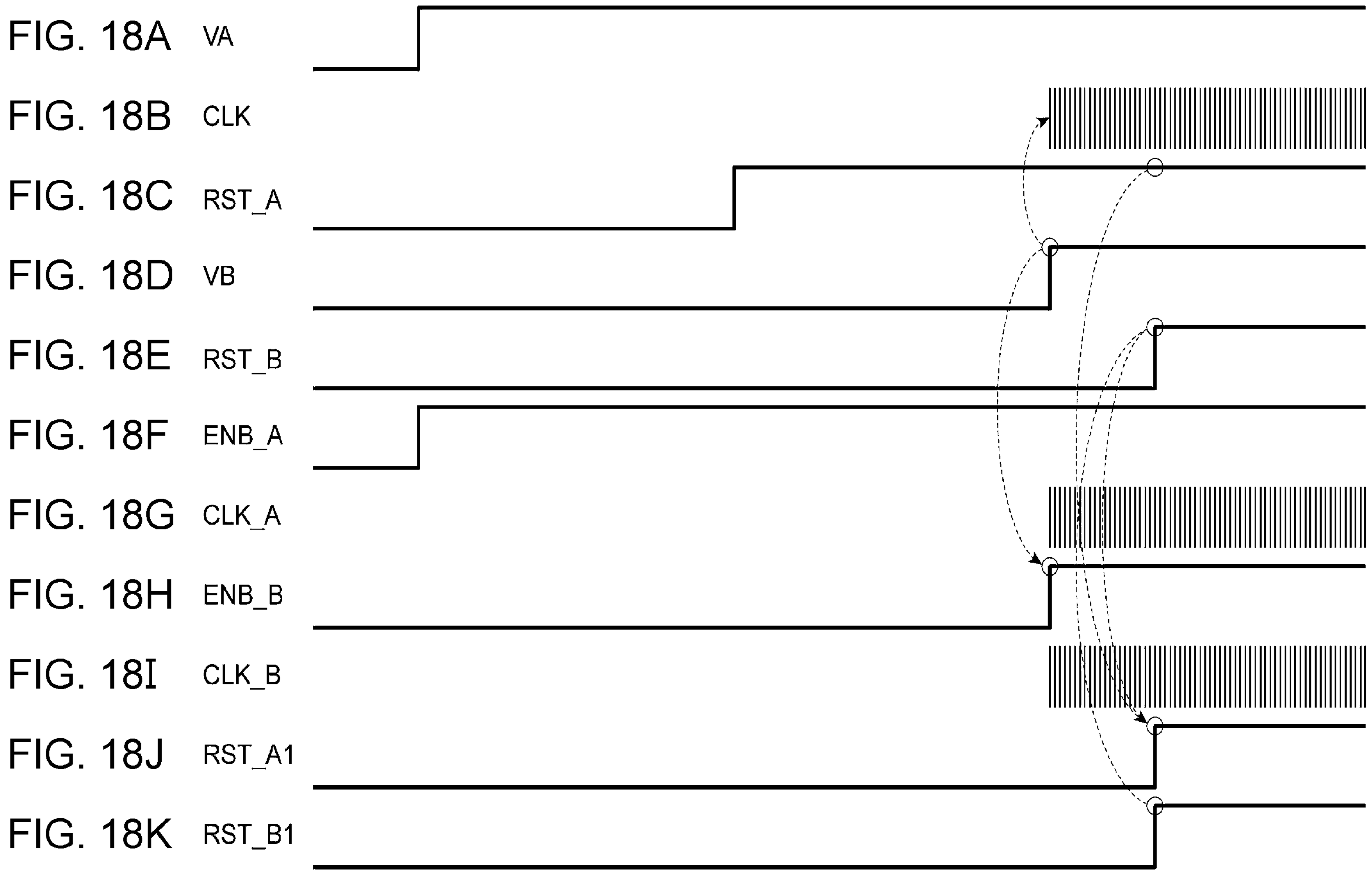
FIGS. 18A, 18B, 18C, 18D, 18E, 18F, 18G, 18H, 18I, 18J, and 18K are diagrams illustrating output timings of various signals in a case where power VA is turned on earlier than power VB.

FIG. 18A illustrates a waveform of the power VA, FIG. 18B illustrates a waveform of a basic clock CLK, FIG. 18C illustrates a waveform of the first reset cancellation signal RST_A for the controller A, FIG. 18D illustrates a waveform of the power VB, FIG. 18E illustrates a waveform of the first reset cancellation signal RST_B for the controller B, FIG. 18F illustrates a waveform of the clock enable signal ENB_A for the controller A, FIG. 18G illustrates a waveform of the clock signal CLK_A supplied to the controller A, FIG. 18H illustrates a waveform of the clock enable signal ENB_B for the controller B, FIG. 18I illustrates a waveform of the clock signal CLK_B supplied to the controller B, FIG. 18J illustrates a waveform of the second reset cancellation signal RST_A1 supplied to the controller A, and FIG. 18K illustrates a waveform of the second reset cancellation signal RST_B1 supplied to the controller B.

As illustrated in FIGS. 18A through 18K, first, the power VA (see FIG. 18A) changes to an ON state.

This change is detected by the clock enable generating unit 191 (see FIG. 17) operating by using continuous power.

The clock enable generating unit 191 that has detected the change of the power VA to an ON state changes the clock enable signal ENB_A for the controller A (see FIG. 18F) to an ON state.

The clock enable signal ENB_A that has changed to an ON state is supplied to the clock generating unit 184.

However, the power VB (see FIG. 18D) supplied to the clock generating unit 184 is in an OFF state, and the clock generating unit 184 has not started output of the basic clock CLK (see FIG. 18B). Accordingly, even in a case where the clock enable signal ENB_A for the controller A is in an ON state, output of the clock signal CLK_A for the controller A (see FIG. 18G) is not started.

The change of the power VA to an ON state is also detected by the reset cancellation unit A (182) (see FIG. 17) provided in the controller A.

The reset cancellation unit A (182) that has detected this change changes the first reset cancellation signal RST_A for the controller A (see FIG. 18C) to an ON state after a predetermined period from detection of the change. This first reset cancellation signal RST_A is given to the reset cancellation signal generating unit 192 of the controller B, but the reset cancellation signal generating unit 192 is not operating at this timing. Accordingly, even in a case where the first reset cancellation signal RST_A changes to an ON state, the second reset cancellation signal RST_A1 for the controller A (see FIG. 18J) is not output.

Eventually, the power VB (see FIG. 18D) changes to an ON state.

When the power VB changes to an ON state, the clock generating unit 184 (see FIG. 17) provided in the controller B starts generation of the basic clock CLK (see FIG. 18B).

At this timing, the clock enable signal ENB_A for the controller A (see FIG. 18F) is already in an ON state. Accordingly, output of the clock signal CLK_A for the controller A (see FIG. 18G) starts at a timing at which the power VB changes to an ON state.

That is, supply of the clock signal CLK_A to the communication unit A (153) starts after supply of the power VA.

Meanwhile, the change of the power VB to an ON state is detected by the clock enable generating unit 191 (see FIG. 17) operating by using continuous power.

The clock enable generating unit 191 that has detected the change of the power VB to an ON state changes the clock enable signal ENB_B for the controller B (see FIG. 18H) given to the clock generating unit 184 (see FIG. 17) to an ON state.

At this timing, the clock generating unit 184 (see FIG. 17) starts output of the clock signal CLK_B for the controller B (see FIG. 18I).

That is, supply of the clock signal CLK_B to the communication unit B (154) of the controller B starts after supply of the power VB.

The change of the power VB (see FIG. 18D) to an ON state is also detected by the reset cancellation unit B (183) (see FIG. 17) provided in the controller B.

The reset cancellation unit B (183) changes the first reset cancellation signal RST_B (see FIG. 18E) to an ON state after a predetermined period from detection of the change.

This first reset cancellation signal RST_B is given to the reset cancellation signal generating unit 192 (see FIG. 17) operating by using continuous power.

At this timing, the first reset cancellation signal RST_A (see FIG. 18C) that is already in an ON state has been already given to the reset cancellation signal generating unit 192.

The reset cancellation signal generating unit 192 generates the second reset cancellation signal RST_A1 for the controller A (see FIG. 18J) as a logical product (negative logical sum) of the first reset cancellation signal RST_A and the first reset cancellation signal RST_B.

Accordingly, the second reset cancellation signal RST_A1 for the controller A is output at a timing at which the first reset cancellation signal RST_B that is in an ON state is input from the reset cancellation unit B (183) provided in the controller B.

The reset cancellation signal generating unit 192 outputs the first reset cancellation signal RST_B as it is as the second reset cancellation signal RST_B1 for the controller B (see FIG. 18K).

Accordingly, supply of the second reset cancellation signal RST_A1 to the communication unit A (153) provided in the controller A is later than supply of the clock signal CLK_A, and supply of the second reset cancellation signal RST_B1 to the communication unit B (154) provided in the controller B is later than supply of the clock signal CLK_B.

Accordingly, both of the communication unit A (153) and the communication unit B (154) of the controller B start operation normally.

Then, the communication units A (153) and 154 shift to a state where an initialization process is executable and starts output of a link pulse.

As a result, a link is established between the communication unit A (153) and the communication unit B (154). This enables communication between the controller A and the controller B.

FIGS. 19A through 19K are views for explaining output timings of various signals in a case where the power VA is turned on later than the power VB.

FIG. 19A illustrates a waveform of the power VA, FIG. 19B illustrates a waveform of a basic clock CLK, FIG. 19C illustrates a waveform of the first reset cancellation signal RST_A for the controller A, FIG. 19D illustrates a waveform of the power VB, FIG. 19E illustrates a waveform of the first reset cancellation signal RST_B for the controller B, FIG. 19F illustrates a waveform of the clock enable signal ENB_A for the controller A, FIG. 19G illustrates a waveform of the clock signal CLK_A supplied to the controller A, FIG. 19H illustrates a waveform of the clock enable signal ENB_B for the controller B, FIG. 19I illustrates a waveform of the clock signal CLK_B supplied to the controller B, FIG. 19J illustrates a waveform of the second reset cancellation signal RST_A1 supplied to the controller A, and FIG. 19K illustrates a waveform of the second reset cancellation signal RST_B1 supplied to the controller B.

As illustrated in FIGS. 19A through 19K, first, the power VB (see FIG. 19D) changes to an ON state.

This change is detected by the clock enable generating unit 191 (see FIG. 17) operating by using continuous power.

The clock enable generating unit 191 that has detected the change of the power VB to an ON state changes the clock enable signal ENB_B for the controller B (see FIG. 19H) to an ON state.

The clock enable signal ENB_B that has changed to an ON state is supplied to the clock generating unit 184.

A clock source of the clock generating unit 184 starts generation of the basic clock CLK (see FIG. 19B) at a timing at which the power VB changes to an ON state. Accordingly, output of the clock signal CLK_B for the controller B (see FIG. 19I) starts at a timing at which the clock enable signal ENB_B that is in an ON state is given.

That is, the clock signal CLK_B for the controller B is supplied later than the power VB.

The change of the power VB to an ON state is detected by the reset cancellation unit B (183) (see FIG. 17) provided in the controller B.

The reset cancellation unit B (183) changes the first reset cancellation signal RST_B (see FIG. 19E) to an ON state after a predetermined period from detection of the change.

The first reset cancellation signal RST_B for the controller B that has changed to an ON state is given to the reset cancellation signal generating unit 192 (see FIG. 17) operating by using continuous power.

FIG. 17 illustrates a case where the reset cancellation signals are individually controlled. Accordingly, the reset cancellation signal generating unit 192 supplies the input first reset cancellation signal RST_B to the communication unit B (154) (see FIG. 17) as the second reset cancellation signal RST_B1 (see FIG. 19K).

Accordingly, the second reset cancellation signal RST_B1 is supplied after start of supply of the clock signal CLK_B.

Accordingly, the communication unit B (154) of the controller B starts operation normally. Then, the communication unit B (154) shifts to a state where an initialization process is executable and starts output of a link pulse.

Eventually, the power VA (see FIG. 19A) changes to an ON state.

The change of the power VA to an ON state is detected by the clock enable generating unit 191 (see FIG. 17) operating by using continuous power.

The clock enable generating unit 191 that has detected this change changes the clock enable signal ENB_A for the controller A (see FIG. 19F) to an ON state.

At this timing, the clock generating unit 184 has already started operation. Accordingly, the clock generating unit 184 that has received the clock enable signal ENB_A that is in an ON state starts output of the clock signal CLK_A for the controller A (see FIG. 19G).

Accordingly, the clock signal CLK_A is supplied to the communication unit A (153) of the controller A after supply of the power VA.

The change of the power VA to an ON state is detected by the reset cancellation unit A (182) (see FIG. 17) provided in the controller A.

The reset cancellation unit A (182) changes the first reset cancellation signal RST_A for the controller A (see FIG. 19C) to an ON state after elapse of a predetermined period from detection of the change.

This first reset cancellation signal RST_A is given to the reset cancellation signal generating unit 192 provided in the controller B.

The reset cancellation signal generating unit 192 supplies, as the second reset cancellation signal RST_A1 for the controller A (see FIG. 19J), a logical product (negative logical sum) of the first reset cancellation signal RST_A for the controller A and the first reset cancellation signal RST_B for the controller B to the communication unit A (153) provided in the controller A.

Accordingly, supply of the second reset cancellation signal RST_A1 to the controller A is later than supply of the clock signal CLK_A.

Accordingly, the communication unit B (154) of the controller A starts operation normally.

Then, the communication unit A (153) of the controller A shifts to a state where an initialization process is executable and starts output of a link pulse.

As a result, a link is established between the communication unit A (153) and the communication unit B (154). This enables communication between the controller A and the controller B.

Example 2-2

Figure 20:
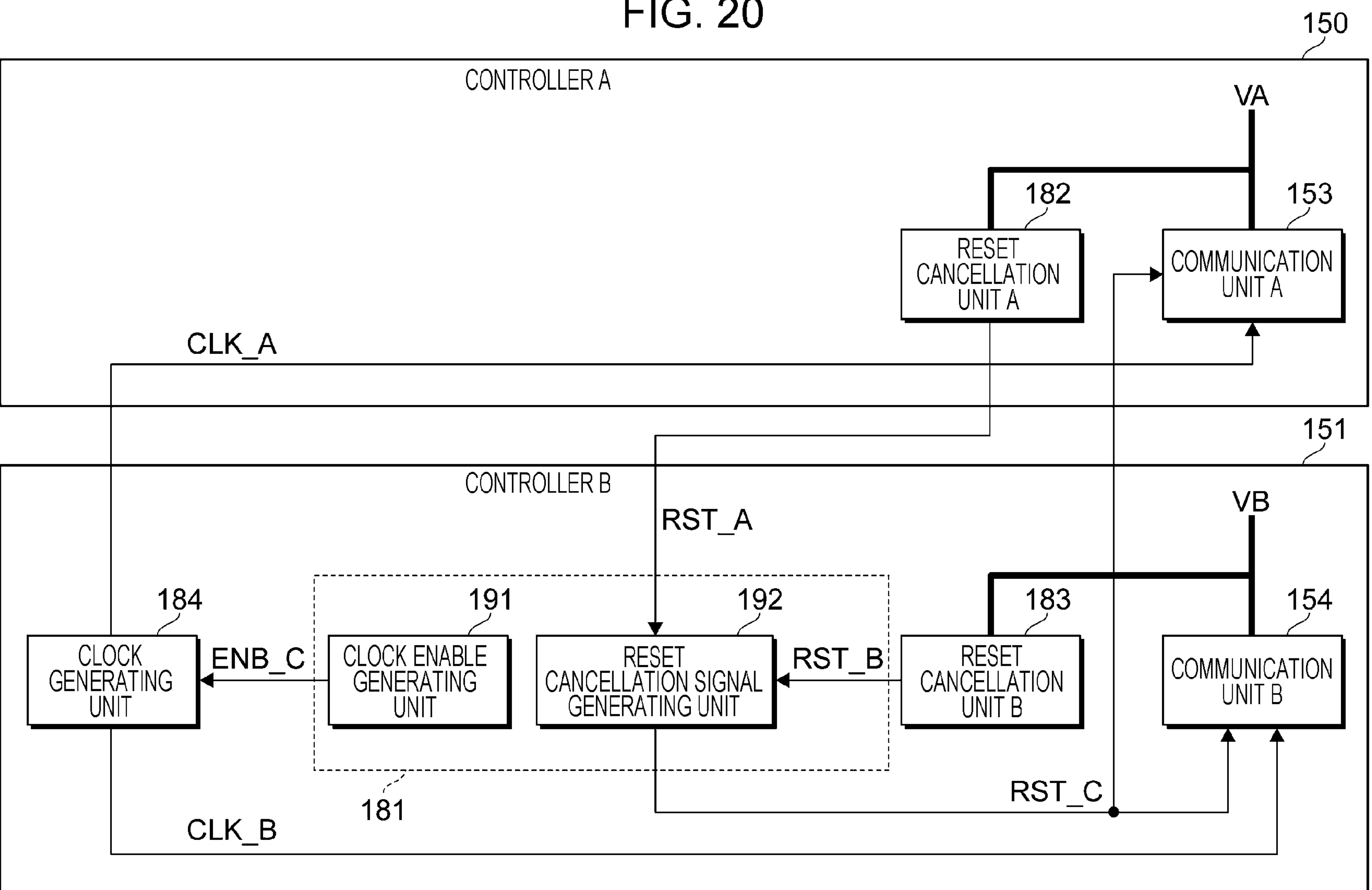
FIG. 20 is a diagram illustrating an example of a hardware configuration according to Example 2-2.

FIG. 20 is a diagram illustrating an example of a hardware configuration according to Example 2-2.

In FIG. 20, parts corresponding to parts of FIG. 16 are given corresponding reference signs.

In the hardware configuration according to Example 2-2, the timing management unit 181 (the clock enable generating unit 191 and the reset cancellation signal generating unit 192) is provided in the controller B, and the clock signals CLK_A and CLK_B are individually controlled.

In the hardware configuration according to Example 2-2, the common second reset cancellation signal RST_C is used unlike Example 2-1 (see FIG. 17).

This hardware configuration is an example of Configuration Example 3 (see FIG. 7).

Control identical to that of Configuration Example 3 can be performed even in a case where the individual clock enable signals ENB_A and ENB_B are prepared as in Configuration Example 1 (see FIG. 3).

For example, operation identical to operation using the common clock enable signal ENB_C is realized by changing the clock enable signal ENB_A and the clock enable signal ENB_B to an ON state at the same timing.

FIGS. 21A through 21K are views for explaining output timings of various signals in a case where the power VA is turned on earlier than the power VB.

FIG. 21A illustrates a waveform of the power VA, FIG. 21B illustrates a waveform of a basic clock CLK, FIG. 21C illustrates a waveform of the first reset cancellation signal RST_A for the controller A, FIG. 21D illustrates a waveform of the power VB, FIG. 21E illustrates a waveform of the first reset cancellation signal RST_B for the controller B, FIG. 21F illustrates a waveform of the common clock enable signal ENB_C, FIG. 21G illustrates a waveform of the clock signal CLK_A supplied to the controller A, FIG. 21H illustrates a waveform of the common clock enable signal ENB_C, FIG. 21I illustrates a waveform of the clock signal CLK_B supplied to the controller B, FIG. 21J illustrates a waveform of the common second reset cancellation signal RST_C, and FIG. 21K illustrates a waveform of the common second reset cancellation signal RST_C.

FIGS. 21A through 21K illustrate an example in which the waveform of the common clock enable signal ENB_C is allocated to the clock enable signal ENB_A for the controller A and the clock enable signal ENB_B for the controller B, assuming a case where operation identical to the operation of Configuration Example 3 is performed by using Configuration Example 1 as described above.

That is, the waveform of the common clock enable signal ENB_C is illustrated at two places (FIGS. 21F and 21H).

Furthermore, FIGS. 21A through 21K illustrate an example in which the waveform of the common second reset cancellation signal RST_C is allocated to the second reset cancellation signal RST_A1 for the controller A and the second reset cancellation signal RST_B1 for the controller B, assuming a case where second reset cancellation signals are individually controlled as in Configuration Example 2.

That is, the waveform of the common second reset cancellation signal RST_C is illustrated at two places (FIGS. 21J and 21K).

In FIGS. 21A through 21K, first, the power VA (see FIG. 21A) changes to an ON state.

This change is detected by the clock enable generating unit 191 (see FIG. 20) of the controller B operating by using continuous power.

However, both of the power VA and the power VB need be in an ON state in order that the common clock enable signal ENB_C changes to an ON state.

Accordingly, even in a case where only the power VA changes to an ON state, the common clock enable signal ENB_C remains in an OFF state.

The change of the power VA to an ON state is also detected by the reset cancellation unit A (182) (see FIG. 20) provided in the controller A.

The reset cancellation unit A (182) changes the first reset cancellation signal RST_A (see FIG. 21C) to an ON state after elapse of a predetermined period from detection of the change.

The first reset cancellation signal RST_A that has changed to an ON state is given to the reset cancellation signal generating unit 192 (see FIG. 20) of the controller B.

However, both of the first reset cancellation signal RST_A for the controller A and the first reset cancellation signal RST_B for the controller B need be in an ON state in order that the reset cancellation signal generating unit 192 changes the common second reset cancellation signal RST_C to an ON state.

Accordingly, even in a case where only the power VA changes to an ON state, the common second reset cancellation signal RST_C (see FIGS. 21J and 21K) remains in an OFF state.

Eventually, the power VB (see FIG. 21D) changes to an ON state.

When the power VB changes to an ON state, the clock generating unit 184 (see FIG. 20) starts generation of the basic clock CLK (see FIG. 21B).

The change of the power VB to an ON state is detected by the clock enable generating unit 191 (see FIG. 20).

The power VA is already in an ON state at a timing at which the power VB changes to an ON state.

Accordingly, the clock enable generating unit 191 changes the common enable signal ENB_C (see FIGS. 21F and 21H) to an ON state.

When the common enable signal ENB_C changes to an ON state, the clock generating unit 184 gives the clock signal CLK_A for the controller A (see FIG. 21G) to the communication unit A (153) (see FIG. 20) provided in the controller A and gives the clock signal CLK_B for the controller B (see FIG. 21I) to the communication unit B (154) (see FIG. 20) provided in the controller B.

As described above, the clock signal CLK_A is supplied to the communication unit A (153) after the power VA changes to an ON state.

Furthermore, the clock signal CLK_B is supplied to the communication unit B (154) after the power VB changes to an ON state.

The change of the power VB to an ON state is also detected by the reset cancellation unit B (183) (see FIG. 20) provided in the controller B.

The reset cancellation unit B (183) that has detected the change changes the first reset cancellation signal RST_B for the controller B (see FIG. 21E) to an ON state after elapse of a predetermined period from detection of the change.

The change of the first reset cancellation signal RST_B for the controller B to an ON state is detected by the reset cancellation signal generating unit 192 operating by using continuous power.

The first reset cancellation signal RST_A (see FIG. 21C) that is in an ON state has been already given to the reset cancellation signal generating unit 192.

The reset cancellation signal generating unit 192 outputs, as the common second reset cancellation signal RST_C (see FIGS. 21J and 21K), a logical product (negative logical sum) of the first reset cancellation signal RST_A for the controller A and the first reset cancellation signal RST_B for the controller B.

Accordingly, the common second reset cancellation signal RST_C changes to an ON state at a timing at which the first reset cancellation signal RST_B for the controller B changes to an ON state.

Accordingly, the common second reset cancellation signal RST_C is supplied to the communication unit A (153) of the controller A after start of supply of the clock signal CLK_A.

Furthermore, the common second reset cancellation signal RST_C is supplied to the communication unit B (154) of the controller B after start of supply of the clock signal CLK_B.

Accordingly, both of the controller A and the controller B start operation normally. Then, the communication unit A (153) and the communication unit B (154) shift to a state where an initialization process is executable and start output of a link pulse.

As a result, a link is established between the communication unit A (153) and the communication unit B (154). This enables communication between the controller A and the controller B.

FIGS. 22A through 22K are views for explaining output timings of various signals in a case where the power VA is turned on later than the power VB.

Figures 22A, 22B, 22C, 22D, 22E, 22F, 22G, 22H, 22I, 22J, 22K:
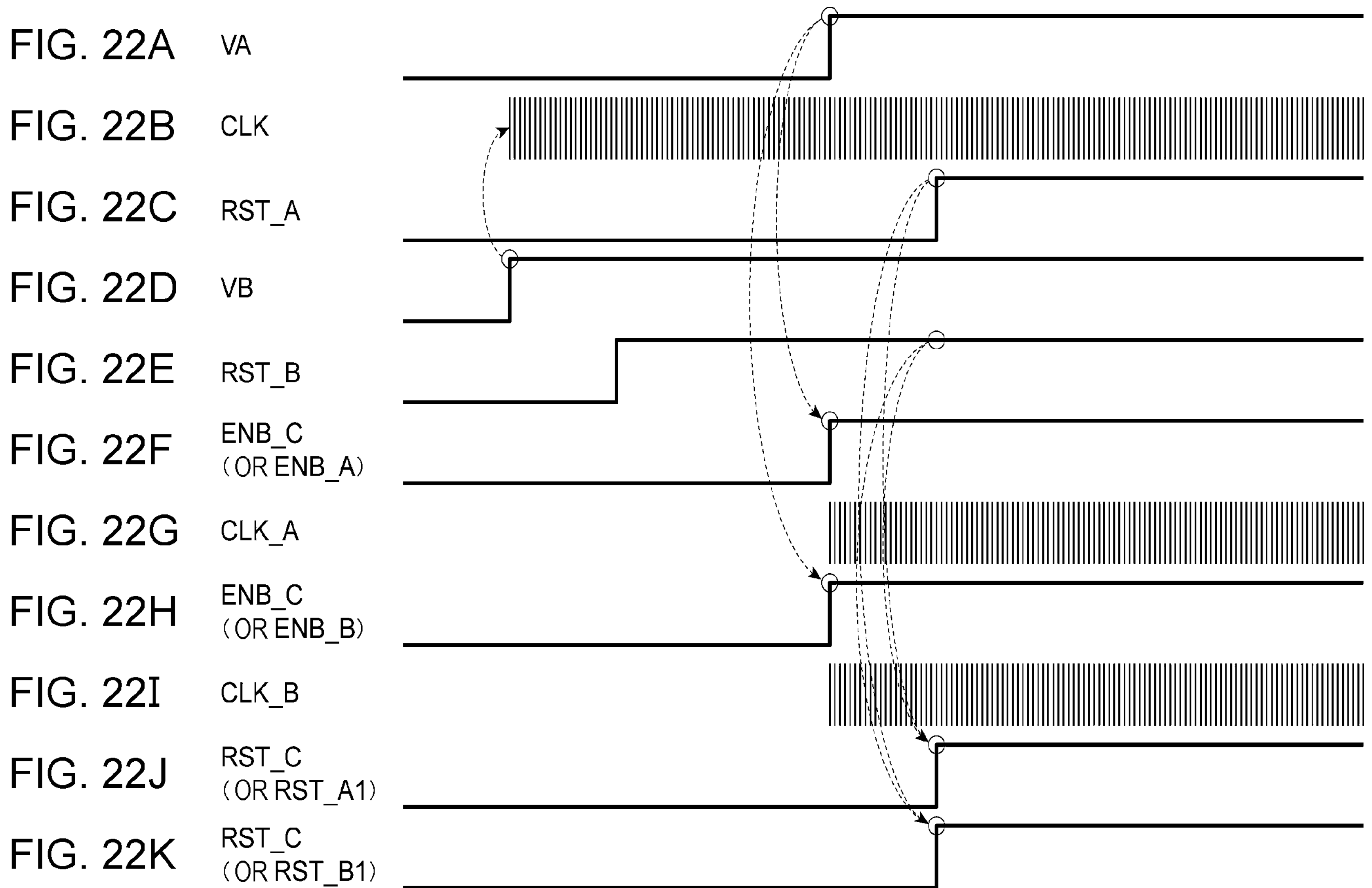
FIGS. 22A, 22B, 22C, 22D, 22E, 22F, 22G, 22H, 22I, 22J, and 22K are diagrams illustrating output timings of various signals in a case where power VA is turned on later than power VB.

FIG. 22A illustrates a waveform of the power VA, FIG. 22B illustrates a waveform of a basic clock CLK, FIG. 22C illustrates a waveform of the first reset cancellation signal RST_A for the controller A, FIG. 22D illustrates a waveform of the power VB, FIG. 22E illustrates a waveform of the first reset cancellation signal RST_B for the controller B, FIG. 22F illustrates a waveform of the common clock enable signal ENB_C, FIG. 22G illustrates a waveform of the clock signal CLK_A supplied to the controller A, FIG. 22H illustrates a waveform of the common clock enable signal ENB_C, FIG. 22I illustrates a waveform of the clock signal CLK_B supplied to the controller B, FIG. 22J illustrates a waveform of the common second reset cancellation signal RST_C, and FIG. 22K illustrates a waveform of the common second reset cancellation signal RST_C.

In FIGS. 22A through 22K, first, the power VB (see FIG. 22D) changes to an ON state.

When the power VB changes to an ON state, the clock generating unit 184 (see FIG. 20) starts generation of the basic clock CLK (see FIG. 22B).

The change of the power VB to an ON state is detected by the clock enable generating unit 191 operating by using continuous power.

However, the clock enable generating unit 191 (see FIG. 20) changes the common enable signal ENB_C (see FIGS. 22F and 22H) to an ON state on a condition that both of the power VA and the power VB are on.

Accordingly, at this timing, the common enable signal ENB_C remains in an OFF state. That is, the clock signal CLK_A for the controller A (see FIG. 22G) and the clock signal CLK_B for the controller B (see FIG. 22I) are not output.

The change of the power VB to an ON state is also detected by the reset cancellation unit B (183) (FIG. 20) provided in the controller B that has started operation.

The reset cancellation unit B (183) changes the first reset cancellation signal RST_B (see FIG. 22E) to an ON state after elapse of a predetermined period from detection of this change.

This first reset cancellation signal RST_B is given to the reset cancellation signal generating unit 192 (see FIG. 20).

The reset cancellation signal generating unit 192 according to this example outputs, as the common second reset cancellation signal RST_C, a logical product (negative logical sum) of the first reset cancellation signal RST_A for the controller A (see FIG. 22C) and the first reset cancellation signal RST_B for the controller B (see FIG. 22E). Accordingly, even in a case where only the power VB is in an ON state, the common second reset cancellation signal RST_C remains in an OFF state.

Eventually, the power VA (see FIG. 22A) changes to an ON state.

When the power VA changes to an ON state, the clock enable generating unit 191 changes the common enable signal ENB_C (see FIGS. 22F and 22H) to an ON state.

This common enable signal ENB_C is given to the clock generating unit 184 (see FIG. 20) that has started operation in synchronization with the power VB.

The clock generating unit 184 gives the clock signal CLK_A for the controller A (see FIG. 22G) to the communication unit A (153) provided in the controller A and gives the clock signal CLK_B for the controller B (see FIG. 22I) to the communication unit B (154) provided in the controller B.

Accordingly, the clock signal CLK_A is supplied to the communication unit A (153) of the controller A after the power VA changes to an ON state.

Furthermore, the clock signal CLK_B is supplied to the communication unit B (154) after the power VB changes to an ON state.

The change of the power VA to an ON state is detected by the reset cancellation unit A (182) (see FIG. 20) provided in the controller A.

The reset cancellation unit A (182) changes the first reset cancellation signal RST_A (see FIG. 22C) to an ON state after elapse of a predetermined period from detection of this change.

This first reset cancellation signal RST_A is given to the reset cancellation signal generating unit 192 operating by using continuous power.

At this timing, the first reset cancellation signal RST_B (see FIG. 22E) that is in an ON state has been already given to the reset cancellation signal generating unit 192.

Accordingly, the reset cancellation signal generating unit 192 changes the common second reset cancellation signal RST_C (see FIGS. 22J and 22K) to an ON state.

Accordingly, the common second reset cancellation signal RST_C is supplied to the communication unit A (153) of the controller A after start of supply of the clock signal CLK_A.

Furthermore, the common second reset cancellation signal RST_C is supplied to the communication unit B (154) of the controller B after start of supply of the clock signal CLK_B.

Accordingly, both of the communication unit A (153) of the controller A and the communication unit B (154) of the controller B start operation normally.

Then, the communication units A (153) and the communication unit B (154) shift to a state where an initialization process is executable and start output of a link pulse.

As a result, a link is established between the communication unit A (153) and the communication unit B (154). This enables communication between the controller A and the controller B.

Example 3: Case Where External Communication Device is Attached to Controller A FIG. 23 is a diagram illustrating an example of a hardware configuration of a control system according to Example 3.

Figure 23:
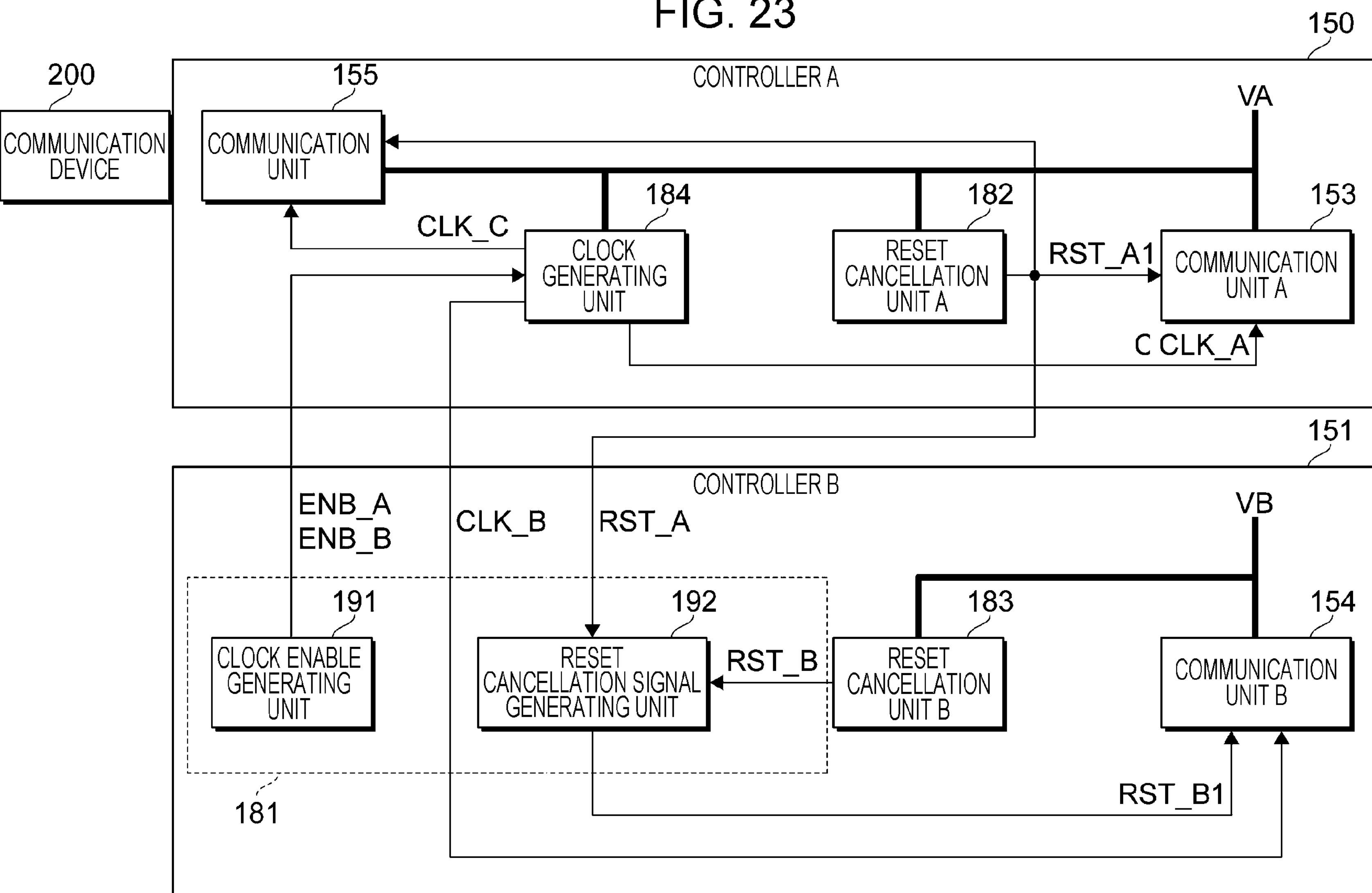
FIG. 23 is a diagram illustrating an example of a hardware configuration of a control system according to Example 3.

In FIG. 23, parts corresponding to parts of FIG. 10 are given corresponding reference signs.

That is, Example 3 is an application of Example 1-1.

Example 3 is different from Example 1-1 in that a communication device 200 is connected to the controller A and that a communication unit 155 used for communication with the communication device 200 is provided in the controller A. The communication device 200 is an example of a substrate.

As illustrated in FIG. 23, the power VA is supplied to the communication unit 155.

A clock signal CLK_C is given to the communication unit 155 by the clock generating unit 184.

Furthermore, a second reset cancellation signal RST_A1 is given not only to the communication unit A (153), but also to the communication unit 155.

A relationship between the communication device 200 and the communication unit 155 in the present exemplary embodiment corresponds, for example, to a relationship between an expansion board and an expansion slot used for expansion of a function of the system controller 150.

The expansion board includes, for example, an accelerator that increases a processing capacity of a CPU and an image processing board that increases speed of image processing. Examples of the accelerator include a CPU accelerator, a graphics accelerator, a three-dimensional accelerator that increases speed of three-dimensional display, and a secure socket layer (SSL) accelerator that increases speed of cryptographic communication.

The following describes operation unique to the hardware configuration of the control system according to Example 3 with reference to the waveform chart of FIG. 11.

Since Example 3 is a modification of Example 1-1, the clock generating unit 184 operates by using the power VA.

Assume that the power VA is turned on earlier than the power VB.

When the power VA changes to an ON state, output of the clock signal CLK_A (see FIG. 11G) supplied to the communication unit A (153) (see FIG. 23) and the clock signal CLK_C (not illustrated) supplied to the communication unit 155 (see FIG. 23) starts.

Then, the reset cancellation unit A (182) (see FIG. 23) provided in the controller A switches the first reset cancellation signal RST_A (see FIG. 11C) to an ON state. The first reset cancellation signal RST_A is given to the communication units A (153) and 155 as it is as the second reset cancellation signal RST_A1 (see FIG. 11J).

That is, to the communication units A (153) and 155, the clock signal CLK_A is supplied after start of supply of the power VA, and the second reset cancellation signal RST_A1 is supplied after start of supply of this clock signal CLK_A.

Accordingly, both of the communication units A (153) and 155 start operation normally.

Hereinafter, the controller A becomes communicable with the communication device 200, and thus a function of the communication device 200 becomes usable.

Meanwhile, since the power VB is in an OFF state, the clock enable signal ENB_B for the controller B (see FIG. 11H) does not change to an ON state, and therefore the clock signal CLK_B for the controller B (see FIG. 11I) is not output from the clock generating unit 184.

Such operation is possible because the clock signals CLK_A (CLK_C) and CLK_B and the second reset cancellation signals RST_A1 and RST_B1 are individually controlled in Example 1-1.

Operation in a case where the power VB is turned on earlier than the power VA is similar to that in FIG. 12.

Accordingly, the function of the external communication device 200 can be used in Example 3.

However, electric power consumption is larger than a case where the external communication device 200 is not attached since electric power is consumed for communication with the external communication device 200.

In the configuration in which the second reset cancellation signal RST_C common to the controller A and the controller B is used as in Example 1-2, initialization of the communication unit 155 cannot be started until the power VB changes to an ON state.

From a different perspective, electric power consumption is smaller in Example 1-2 than in Example 1-1.

Other Exemplary Embodiments

Although the exemplary embodiment of the present disclosure has been described, the technical scope of the present disclosure is not limited to the scope described in the above exemplary embodiment. It is clear from the recitation of the claims that various changes and modifications to the above exemplary embodiment are also encompassed within the technical scope of the present disclosure.

(1) In the above examples, a case (Examples 1-1 and 2-1) in which control of the clock signals CLK_A and the CLK_B is individual and control of the second reset cancellation signals RST_A1 and RST_B1 is individual and a case (Examples 1-2 and 2-2) where control of the clock signals CLK_A and CLK_B is common and control of the second reset cancellation signals RST_A1 and RST_B1 is common. However, other control methods are also possible.

FIG. 24A through 24J are views for explaining output timings of various signals in a case where control of the clock signal CLK_A and CLK_B is individual and control of the second reset cancellation signal RST_A1 and RST_B1 is common and where the power VA is turned on earlier than the power VB.

Figures 24A, 24B, 24C, 24D, 24E, 24F, 24G, 24H, 24I, 24J:
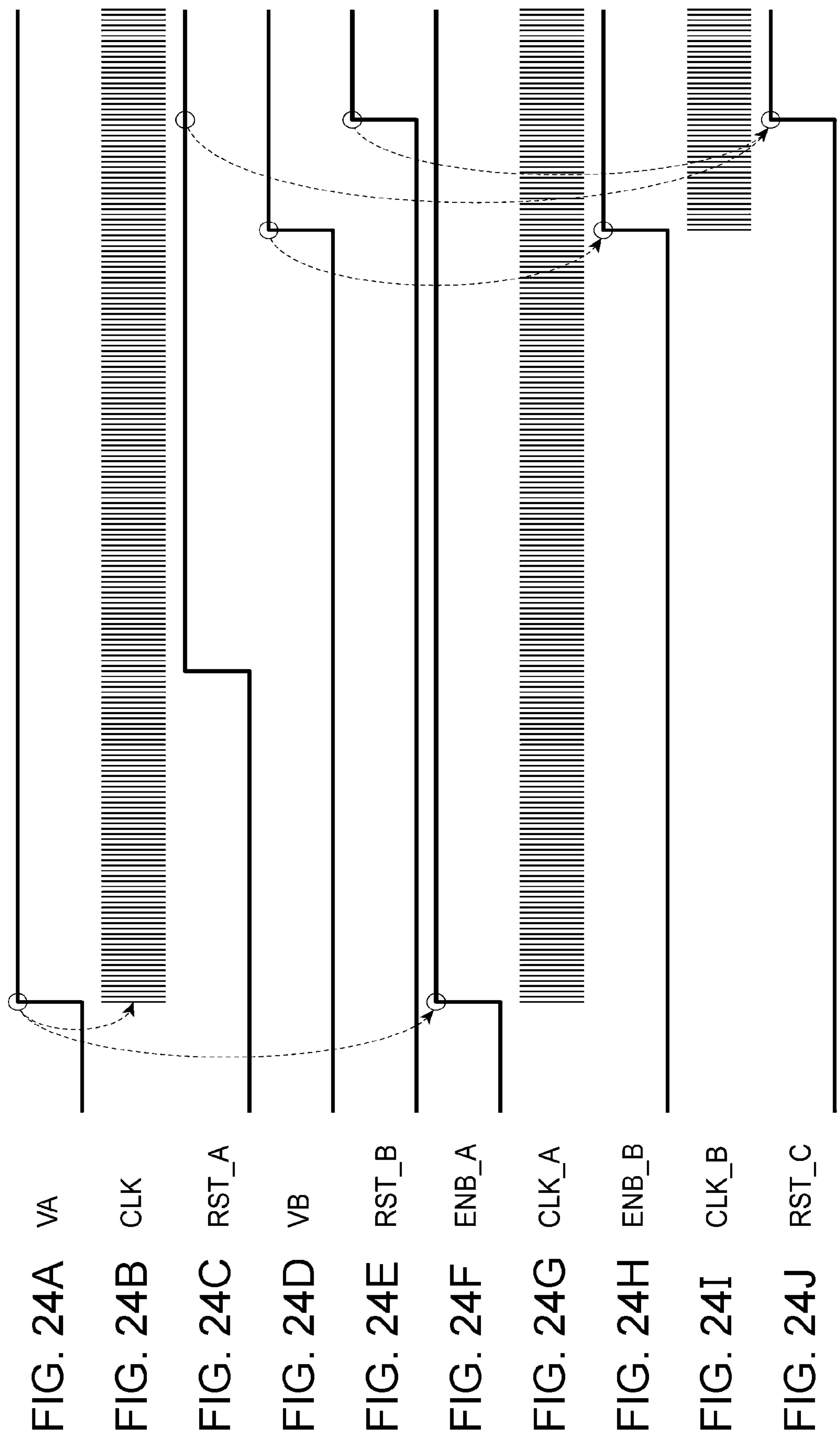
FIGS. 24A, 24B, 24C, 24D, 24E, 24F, 24G, 24H, 24I and 24J are diagrams illustrating output timings of various signals in a case where control of clock signals CLK_A and CLK_B is individual and control of second reset cancellation signals RST_A1 and RST_B1 is common and power VA is turned on earlier than power VB.

FIG. 24A illustrates a waveform of the power VA, FIG. 24B illustrates a waveform of a basic clock CLK, FIG. 24C illustrates a waveform of the first reset cancellation signal RST_A for the controller A, FIG. 24D illustrates a waveform of the power VB, FIG. 24E illustrates a waveform of the first reset cancellation signal RST_B for the controller B, FIG. 24F illustrates a waveform of the clock enable signal ENB_A for the controller A, FIG. 24G illustrates a waveform of the clock signal CLK_A supplied to the controller A, FIG. 24H illustrates a waveform of the clock enable signal ENB_B for the controller B, FIG. 24I illustrates a waveform of the clock signal CLK_B supplied to the controller B, and FIG. 24J illustrates a waveform of the common second reset cancellation signal RST_C supplied to the controller A and the controller B.

The output timings illustrated in FIGS. 24A through 24J correspond, for example, to a combination of the operation of the clock enable generating unit 191 in Example 1-1 (see FIG. 10) and the operation of the reset cancellation signal generating unit 192 in Example 1-2 (see FIG. 13).

The output timings illustrated in FIGS. 24A through 24J, in which the power VA is turned on earlier than the power VB, are described from the perspective of the differences from FIG. 11.

In this case, the reset cancellation signal generating unit delays output of the common second reset cancellation signal RST_C until both of the first reset cancellation signal RST_A for the controller A and the first reset cancellation signal RST_B for the controller B change to an ON state, as in Example 1-2 (see FIG. 14).

Since output of the common second reset cancellation signal RST_C is later than both of the clock signals CLK_A and CLK_B, the communication unit A (153) of the controller A and the communication unit B (154) of the controller B operate normally.

FIGS. 25A through 25J are views for explaining output timings of various signals in a case where control of the clock signals CLK_A and CLK_B is individual and control of the second reset cancellation signals RST_A1 and RST_B1 is common and where the power VA is turned on later than the power VB.

Figures 25A, 25B, 25C, 25D, 25E, 25F, 25G, 25H, 25I, 25J:
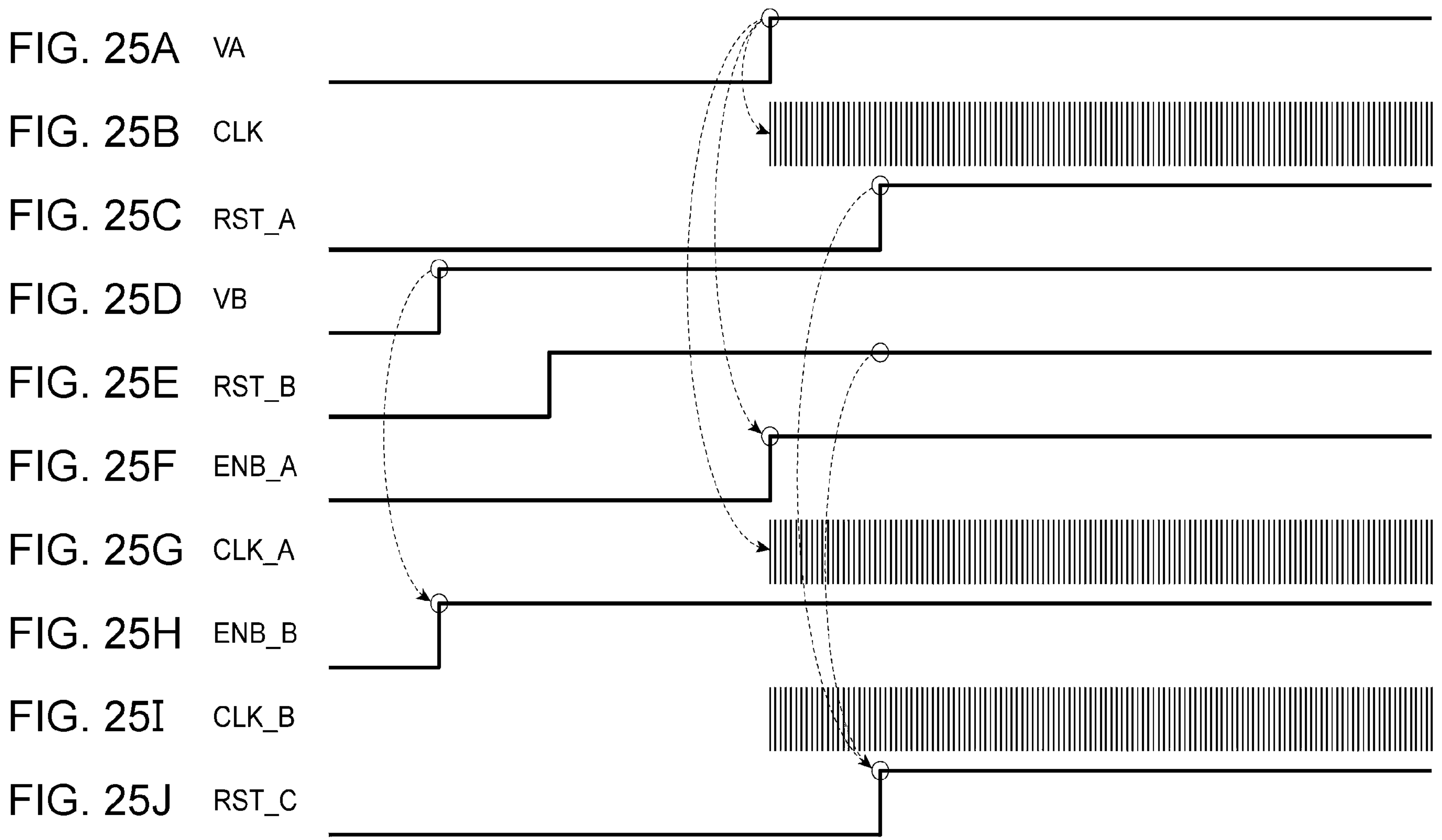
FIGS. 25A, 25B, 25C, 25D, 25E, 25F, 25G, 25H, 25I and 25J are diagrams illustrating output timings of various signals in a case where control of clock signals CLK_A and CLK_B is individual and control of second reset cancellation signals RST_A1 and RST_B1 is common and power VA is turned on later than power VB.

FIG. 25A illustrates a waveform of the power VA, FIG. 25B illustrates a waveform of a basic clock CLK, FIG. 25C illustrates a waveform of the first reset cancellation signal RST_A for the controller A, FIG. 25D illustrates a waveform of the power VB, FIG. 25E illustrates a waveform of the first reset cancellation signal RST_B for the controller B, FIG. 25F illustrates a waveform of the clock enable signal ENB_A for the controller A, FIG. 25G illustrates a waveform of the clock signal CLK_A supplied to the controller A, FIG. 25H illustrates a waveform of the clock enable signal ENB_B for the controller B, FIG. 25I illustrates a waveform of the clock signal CLK_B supplied to the controller B, and FIG. 25J illustrates a waveform of the common second reset cancellation signal RST_C supplied to the controller A and the controller B.

The output timings illustrated in FIGS. 25A through 25J correspond, for example, to a combination of the operation of the clock enable generating unit 191 in Example 1-1 (see FIG. 10) and the operation of the reset cancellation signal generating unit 192 in Example 1-2 (see FIG. 13).

The output timings illustrated in FIGS. 25A through 25J, in which the power VA is turned on earlier than the power VB, are described from the perspective of the differences from FIG. 12.

The output timings of FIGS. 25A through 25J are basically identical to the output timings of FIGS. 12A through 12K. Accordingly, the communication unit A (153) of the controller A and the communication unit B (154) of the controller B operate normally.

(2) For example, in the above examples, whether control of output of the clock signals CLK_A and CLK_B is individual (individual mode) or common (common mode) and whether control of output of the second reset cancellation signals RST_A1 and RST_B1 is individual (individual mode) or common (common mode) are fixed, but these control modes may be switched individually.

Figures 26, 27A, 27B, 27C:
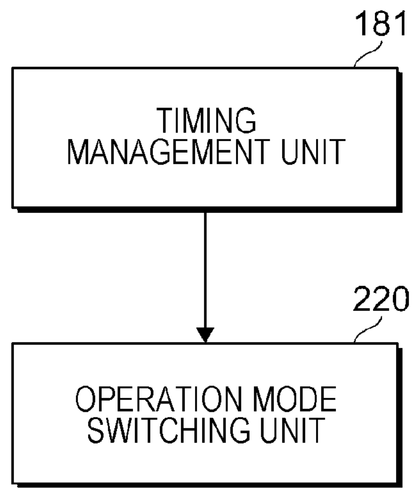

FIG. 26 is a view for explaining an operation mode switching function.

In FIG. 26, an operation mode switching unit 220 is connected to the timing management unit 181, and the operation mode switching unit 220 gives an instruction concerning an operation mode to the timing management unit 181.

It is assumed that the timing management unit 181 has the clock enable generating unit 191 (see FIG. 10) that individually outputs the clock enable signals ENB_A and ENB_B and the reset cancellation signal generating unit 192 that individually outputs the second reset cancellation signals RST_A1 and RST_B1 as in Example 1-1 (see FIG. 10).

In a case where the clock enable signals ENB_A and ENB_B are in the individual mode, a change to an ON state at different output timings is permitted. Meanwhile, in a case where the clock enable signals ENB_A and ENB_B are in the common mode, the clock enable signals ENB_A and ENB_B are controlled so as to change to an ON state at the same timing.

In a case where the second reset cancellation signals RST_A1 and RST_B1 are in the individual mode, a change to an ON state at different output timings is permitted. Meanwhile, in a case where the second reset cancellation signals RST_A1 and RST_B1 are in the common mode, the second reset cancellation signals RST_A1 and RST_B1 are controlled so as to change to an ON state at the same timing.

FIGS. 27A through 27C are views for explaining an example of operation mode switching. FIG. 27A illustrates switching based on setting of a switch, FIG. 27B illustrates switching based on a target device, and FIG. 27C illustrates switching based on a purpose.

In FIGS. 27A through 27C, in a case of switching using a physical switch, a register for switching of an operation mode need just be prepared. Option clock (CLK) and option reset (RST) in FIGS. 27A through 27C correspond to a clock signal and a reset cancellation signal given to the communication unit 155 (see FIG. 23) used for communication with the external communication device 200 (see FIG. 23). Standard clock (CLK) and standard reset (RST) are a clock signal and a reset cancellation signal given to the communication unit A (153) (see FIG. 9) and the communication unit B (154) (see FIG. 9).

FIG. 27B illustrate, as an example of switching based on a target device, an operation mode of a clock signal and a reset cancellation signal used between the controller A and the controller B and an operation mode of a clock signal and a reset cancellation signal used between the controller A and a controller C. The number of controllers is not limited to two and may be three or more. The controller B is an example of a target to be controlled by the controller A. A target to be controlled may be a device connected to the controller B.

FIG. 27C illustrates, as examples of switching based on a purpose, an example in which a priority is placed on electric power or a function. The example in which a priority is placed on a function corresponds, for example, to the individual mode in which communication with the communication device 200 (see FIG. 23) is possible. Furthermore, the example in which a priority is placed on electric power corresponds, for example, to the common mode in which communication with the communication device 200 is impossible.

(3) Although a case where the information processing apparatus is the image forming apparatus 100 (see FIG. 1) has been described in the above exemplary embodiment, the information processing apparatus may be a gaming console, a smartphone, a tablet PC, an image recording reproducing apparatus, a display device, or any of other information processing apparatuses.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:

a first control circuit that operates while receiving first power and executes device-independent control;

a second control circuit that operates while receiving second power and controls a device on a basis of a command from the first control circuit;

a clock management circuit that is coupled to the first control circuit and operates while receiving continuous power, and limits supply of a first clock signal to the first control circuit until the first power is supplied and limits supply of a second clock signal to the second control circuit until the second power is supplied; and a reset cancellation management circuit that is coupled to the second control circuit and operates while receiving continuous power, limits supply of a first reset cancellation signal to the first control circuit until operation using the first clock signal starts and limits supply of a second reset cancellation signal to the second control circuit until operation using the second clock signal starts, wherein supply of the first clock signal is controlled by a first enable signal line, and supply of the second clock signal is controlled by a second enable signal line, in response to a restart operation of the first control circuit, the first power is supplied to the first control circuit before the second power is supplied to the second control circuit, the second power is not supplied to the second control circuit until the first reset cancellation signal is supplied to the first control circuit, in response to a restart operation of the second control circuit, the second power is supplied to the second control circuit before the first power is supplied to the first control circuit, the first power is not supplied to the first control circuit until the second reset cancellation signal is supplied to the second control circuit, the first power and the second power originates from different power sources, and a power source of the first clock or the second clock is different from the first power or the second power.

2. The information processing apparatus according to claim 1, wherein supply of the first clock signal and the second clock signal is controlled by a single enable signal line.

3. The information processing apparatus according to claim 2, wherein the first reset cancellation signal and the second reset cancellation signal are supplied through a common signal line.

4. The information processing apparatus according to claim 1, wherein supply of the first clock signal and supply of the second clock signal are individually controlled; and the first reset cancellation signal and the second reset cancellation signal are supplied through a common signal line.

5. The information processing apparatus according to claim 1, wherein supply of the first clock signal and supply of the second clock signal are controlled at individual timings; and the first reset cancellation signal and the second reset cancellation signal are supplied through individual signal lines.

6. The information processing apparatus according to claim 1, wherein supply of the first clock signal and supply of the second clock signal are controlled at a common timing; and the first reset cancellation signal and the second reset cancellation signal are supplied through a common signal line.

7. The information processing apparatus according to claim 1, wherein at least one of the clock management circuit and the reset cancellation management circuit is provided outside the first control circuit and the second control circuit.

8. The information processing apparatus according to claim 7, wherein the clock management circuit and the reset cancellation management circuit are modularized.

9. The information processing apparatus according to claim 1, wherein in a ease where an external substrate that operates while receiving the first power s connected to the first control circuit, the clock management circuit limits supply of the first clock signal to the substrate until the first power is supplied, and the reset cancellation management circuit limits supply of the first reset cancellation signal to the substrate until operation of the first control circuit starts.

10. The information processing apparatus according to claim 1, wherein the clock management circuit limits supply of the first clock signal and supply of the second clock signal until supply of both of the first power and the second power starts; and the reset cancellation management circuit limits supply of the first reset cancellation signal and supply of the second reset cancellation signal until supply of both of the first power and the second power starts.

11. The information processing apparatus according to claim 1, wherein whether control of the limitation of supply of the first clock signal and the limitation of supply of the second clock signal is individual or common is switchable.

12. The information processing apparatus according to claim 11, wherein how to control the limitation of supply of the first clock signal and the limitation of supply of the second clock signal is switched in accordance with a target directly or indirectly controlled by the first control circuit or in accordance with a purpose.

13. The information processing apparatus according to claim 12, wherein how to control the limitation of supply of the first reset cancellation signal and the limitation of supply of the second reset cancellation signal is switched in accordance with a target directly or indirectly controlled by the first control circuit or in accordance with a purpose.

14. The information processing apparatus according to claim 1, wherein whether control of the limitation of supply of the first reset cancellation signal and the limitation of supply of the second reset cancellation signal is individual or common is switchable.

15. An information processing apparatus comprising:

a first control circuit that operates while receiving first power and executes device-independent control;

a second control circuit that operates while receiving second power and controls a device on a basis of a command from the first control circuit;

a first management circuit that is coupled to the first control circuit and operates while receiving continuous power, and limits supply of a first clock signal to the first control circuit until the first power is supplied and limits supply of a first reset cancellation signal to the first control circuit until operation using the first clock signal starts; and a second management circuit that is coupled to the second control circuit and operates while receiving continuous power, and limits supply of a second clock signal to the second control circuit until the second power is supplied and limits supply of a second reset cancellation signal to the second control circuit until operation using the second clock signal starts, wherein supply of the first clock signal is controlled by a first enable signal line, and supply of the second clock signal is controlled by a second enable signal line, in response to a restart operation of the first control circuit, the first power is supplied to the first control circuit before the second power is supplied to the second control circuit, the second power is not supplied to the second control circuit until the first reset cancellation signal is supplied to the first control circuit, in response to a restart operation of the second control circuit, the second power is supplied to the second control circuit before the first power is supplied to the first control circuit, the first power is not supplied to the first control circuit until the second reset cancellation signal is supplied to the second control circuit, the first power and the second power originates from different power sources, and a power source of the first clock or the second clock is different from the first power or the second power.

16. A circuit device comprising:

a first control circuit that operates while receiving first power, executes device-independent control, and gives a command to a second control circuit that controls a device while receiving second power;

a clock management circuit that is coupled to the first control circuit and operates while receiving continuous power, and limits supply of a first clock signal to the first control circuit until the first power is supplied and limits supply of a second clock signal to the second control circuit until the second power is supplied; and a reset cancellation management circuit that is coupled to the second control circuit and operates while receiving continuous power, limits supply of a first reset cancellation signal to the first control circuit until operation using the first clock signal starts and limits supply of a second reset cancellation signal to the second control circuit until operation using the second clock signal starts, wherein supply of the first clock signal is controlled by a first enable signal line, and supply of the second clock signal is controlled by a second enable signal line, in response to a restart operation of the first control circuit, the first power is supplied to the first control circuit before the second power is supplied to the second control circuit, the second power is not supplied to the second control circuit until the first reset cancellation signal is supplied to the first control circuit, in response to a restart operation of the second control circuit, the second power is supplied to the second control circuit before the first power is supplied to the first control circuit, the first power is not supplied to the first control circuit until the second reset cancellation signal is supplied to the second control circuit, the first power and the second power originates from different power sources, and a power source of the first clock or the second clock is different from the first power or the second power.

* * * * *